United States Patent [19]
Koslov et al.

[11] Patent Number: 5,978,420
[45] Date of Patent: Nov. 2, 1999

[54] METHODS AND APPARATUS FOR IMPLEMENTING A DIGITAL MODULATOR

[75] Inventors: Joshua L. Koslov, Hopewell; Frank A. Lane, Medford Lakes; Carl G. Scarpa, Plainsboro, all of N.J.

[73] Assignee: Hitachi America, Ltd., Tarrytown, N.Y.

[21] Appl. No.: 09/200,084

[22] Filed: Nov. 25, 1998

Related U.S. Application Data

[62] Division of application No. 08/789,437, Jan. 27, 1997, Pat. No. 5,783,974.

[51] Int. Cl.$^6$ ................................................ H04L 27/20
[52] U.S. Cl. ........................ 375/295; 375/308; 332/103; 708/313
[58] Field of Search ..................... 375/279, 295, 375/296, 308; 332/103, 104, 105, 149; 708/313

[56] References Cited

U.S. PATENT DOCUMENTS

| | | | |
|---|---|---|---|
| 4,516,078 | 5/1985 | Yanagihara et al. | 327/555 |
| 5,383,144 | 1/1995 | Kato | 708/313 |
| 5,412,352 | 5/1995 | Graham | 332/103 |
| 5,534,828 | 7/1996 | Okada et al. | 332/103 |
| 5,590,158 | 12/1996 | Yamaguchi et al. | 375/331 |
| 5,732,107 | 3/1998 | Phillips et al. | 375/296 |
| 5,764,113 | 6/1998 | Snell | 332/103 |
| 5,783,974 | 7/1998 | Koslov et al. | 332/3 |
| 5,793,818 | 8/1998 | Claydon et al. | 375/326 |
| 5,815,046 | 9/1998 | Spilker, Jr. et al. | 332/103 |
| 5,872,480 | 2/1999 | Huang | 329/304 |
| 5,878,088 | 3/1999 | Knutson et al. | 375/324 |
| 5,880,973 | 3/1999 | Gray et al. | 702/190 |

*Primary Examiner*—Young T. Tse
*Attorney, Agent, or Firm*—Michaelson & Wallace; Peter L. Michaelson; Michael P. Straub

[57] ABSTRACT

In accordance with the present invention an interpolation technique is used to convert a low rate digital signal to a high rate signal and to shift the carrier to a desired frequency. This is accomplished, by first positioning the information signal, e.g., the digital waveform to be modulated on a carrier at a relatively low rate using a digital mixer operating at a fraction of the ultimate digital to analog conversion frequency. The relatively low rate signal generated by the mixing operation is then converted to a high rate signal by one or more interpolator stages. An adjustable passband filter circuit is included in each interpolation stage. One feature of the present invention is directed to a control circuit which is response to an H bit frequency control word representing a desired output carrier frequency. The control circuit generates individual filter control signals for each adjustable filter circuit from the single H bit frequency control word. An oscillator control circuit which is responsive to a portion of the H bit frequency control word is also described.

6 Claims, 19 Drawing Sheets

THIRD STAGE
FREQUENCY RANGE

FILTER
CONFIGURATION 1

FILTER
CONFIGURATION 2

FILTER
CONFIGURATION 3

FILTER
CONFIGURATION 4

SECOND STAGE FREQUENCY RANGE

FILTER CONFIGURATION 1

FILTER CONFIGURATION 2

FILTER CONFIGURATION 3

FILTER CONFIGURATION 4

00000000    01000000

METHODS AND APPARATUS FOR IMPLEMENTING A DIGITAL MODULATOR

RELATED APPLICATIONS

This application is a divisional of U.S. patent application Ser. No. 08/789,437, now U.S. Pat. No. 5,783,974, titled "METHODS AND APPARATUS FOR CONTROLLING A DIGITAL MODULATOR" which was filed on Jan. 27, 1997 and which is hereby expressly incorporated by reference.

FIELD OF THE INVENTION

The present invention is directed to configurable filters and, more particularly, to methods and apparatus for implementing and controlling digital filters suitable for use in modulators.

BACKGROUND OF THE INVENTION

The use of digital signals for the transmission of various types of information continues to grow in importance.

Digital modulation involves the mapping of bits into symbols, filtering the symbols into desired pulse shapes, and the translation of the baseband pulses onto a carrier signal for transmission. The mapping of bits into symbols involves, e.g., collecting N bits and mapping those bits into 1 of $2^N$ signal amplitude and phase values. As an example, consider QPSK (Quadrature Phase Shift Keying) which maps 2 bits into 1 of 4 amplitude and phase values as illustrated in FIG. 1.

Pulse shaping is used to limit the bandwidth of the transmitted signal to the desired channel bandwidth. It can be accomplished by a digital filtering operation and is often implemented as an FIR (finite impulse response filter). Because the channel bandwidth must be wider than the symbol transmission rate, the rate at which the pulse shaping filter operates must be greater than the symbol rate. Generally, it must be at least twice the channel bandwidth but is often greater than that so as to be an integer multiple of the symbol rate, for example 2x or 4x the symbol rate. The normalized frequency characteristics for a representative 4x low pass pulse shaping filter is illustrated in FIG. 2.

In various known modulators, the translation to a carrier frequency is often carried out after the signal is converted from a digital to an analog signal. In such embodiments, a mixing operation is performed in the analog domain to convert the information signal up to the carrier frequency.

Such known systems have the disadvantage of requiring analog mixers along with other associated analog circuitry. In view of the high degree of reliability of digital integrated circuits as compared to analog system components, there are advantages in moving to a design implemented using all or almost all digital as opposed to analog circuitry.

One particular known modulator which is described in U.S. Pat. No. 5,412,352 is illustrated in FIG. 3. The modulator of FIG. 3 requires a single frequency translation from a digital baseband signal to a selected carrier frequency. This frequency translation is performed in the digital domain.

The modulator of FIG. 3 includes a symbol mapping circuit 72, a pulse shaping circuit 73, an interpolator 74, first and second mixers 75, 76 for mixing the digital I and Q signals output by the interpolator 74, an oscillator 78, a phase shifter 77, a summer 80, and a D/A converter 79. The oscillator 78 and mixers 75, 76 are located after the interpolator 74.

In the known modulator 70, in order to create a digital signal at the relatively high frequency of the carrier signal, e.g., 5–40 MHz, an interpolator 74 is placed between the output of the pulse shaping circuit 73 and the mixers 75, 76.

Unfortunately, each of the known systems suffers from the disadvantage of either performing a mixing operation to the carrier frequency in the analog domain or, as in the case of the modulator illustrated in FIG. 3, having to provide digital mixers 75, 76 capable of operating at the ultimate sampling frequency. Because of the relatively high carrier frequency, e.g., 40 MHz, the cost of implementing such mixers 75, 76 can be prohibitive in certain applications. This is due in large part to the cost of high speed multipliers needed to implement the mixers 75, 76.

Accordingly, there is a need for a digital modulator capable of mixing a signal to a carrier frequency in the digital domain that can be implemented at a reasonable cost. Furthermore, there is a need for methods and apparatus for implementing and controlling, at a reasonable cost, digital filters used to implement a digital modulator.

SUMMARY OF THE PRESENT INVENTION

The present invention relates to methods and apparatus for directly synthesizing a signal, e.g., a digital signal, on a carrier signal. Various embodiments of the present invention are directed to configurable filter implementations and to methods of controlling configurable filters as part of a modulator which employs configurable filters in one or more upsampling stages.

The present invention can be used for modulating signals which can be represented by an amplitude, or by in-phase and quadrature amplitudes, including, e.g., AM (amplitude modulation), VSB (vestigial sideband), SSB (single side band), QPSK (quadrature phase shift keying), QAM (quadrature amplitude modulation), or digital (e.g., multilevel) VSB. For purposes of an exemplary embodiment, the present invention will be described, where the signal type is relevant, in terms of a QPSK modulator. However, it is to be understood that the present invention is in no way limited to a QPSK embodiment.

The in-phase and/or quadrature amplitudes of a signal may represent, e.g., levels indicative of symbols in a digital information transmission system.

In accordance with the present invention, an interpolation technique is used to convert a low rate signal, e.g., a digital signal, to a high rate signal and to shift the carrier to a desired frequency. This is accomplished, in accordance with the present invention, by positioning the information signal, e.g., the digital waveform to be modulated, on a carrier at a relatively low rate. This is accomplished by performing a digital mixing operation. The relatively low rate signal generated by the mixing operation is then converted to a high rate signal by a cascade of interpolator stages.

In one embodiment, a passband filter, e.g., a configurable filter, is included in each interpolation stage. The passband filter of each stage is controlled so that it is configured to have one of several possible transfer functions. Each one of the possible transfer functions has a passband in a different part of the digital spectrum. The choice of filter configurations through one or more stages is used to result in the shifting of the carrier from a frequency in the nyquist bandwidth of the low rate signal to virtually any frequency in the nyquist bandwidth of the final output, e.g., transmission rate. By using the interpolator circuitry of the present invention to perform the frequency shifting operation, an information signal can be shifted to a high carrier frequency in the digital domain. Significantly, this is done without the need for a digital mixer that operates at the high carrier frequency.

In accordance with one embodiment of the present invention, the configuration of a filter is effectively selected by shifting the input signal at the input to the passband filter and then frequency shifting the filter output signal in the opposite direction. As a result of the frequency shifting operations performed before and after the passband filtering operation, the result is effectively the same as if the filter passband had been changed and the signal being filtered had not been shifted. This frequency shifting technique at the input and output of each filter, is applied, in accordance with one embodiment of the present invention to control a plurality of filters cascaded together as part of a plurality of interpolation stages.

While the signal frequency shifting technique of the present invention requires frequency shifting circuitry at the inputs and outputs of passband filters to effectively create a configurable passband filter circuit, this approach may, e.g., in the case of multi-tap filters, be more cost effective to implement than systems which shift the center frequency of a filter's passband, e.g., by changing filter coefficient vales, to achieve a desired filter transfer function.

Relatively simple, and thus relatively inexpensive, frequency shifting circuits suitable for use in accordance with the present invention are described in the detailed description that follows.

In addition to the various configurable filter designs of the present invention, the present invention is also directed to methods and apparatus that are suitable for controlling configurable filters, e.g., used in an interpolator of a modulator.

In one particular embodiment a multi-bit binary control word is used to specify a desired ultimate output frequency. A limited number of bits, e.g., a preselected three bits of the control word, are then used to generate a control signal used to control the configuration of a filter at one stage of a multi-stage interpolator as required to achieve the carrier output frequency specified by the control word. A different set of 3 bits may be used to control each of the filters. A portion of the control word may also be used to control an oscillator used to mix the signal supplied to the input of the interpolation circuit of the present invention.

While the use of the various methods and apparatus of the present invention are described in the context of a digital pulse modulator, the methods and apparatus of the present invention are applicable to a wide variety of applications where it is desirable or necessary to use or control configurable digital filters.

As a result of the present invention it is possible to provide a less costly and easier to implement modulator than the prior art digital designs, while maintaining the advantages of performing the modulation operations in the digital domain.

Many other features and embodiments of the present invention are described in detail below.

DETAILED DESCRIPTION

The present invention relates to methods and apparatus for directly synthesizing a signal, e.g., a digital signal, on a carrier signal. As discussed above, the present invention can be used for modulating any signal which can be represented by an amplitude or by in-phase and quadrature phase amplitudes.

Figure 1:
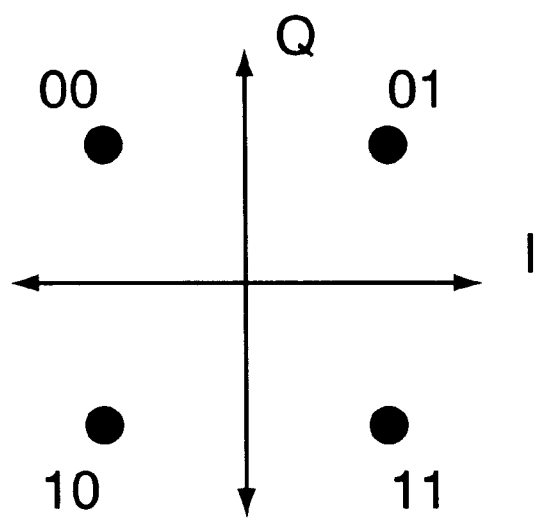
FIG. 1 is a diagram illustrating the four possible amplitude and phase values of a QPSK signal.
Figure 2:
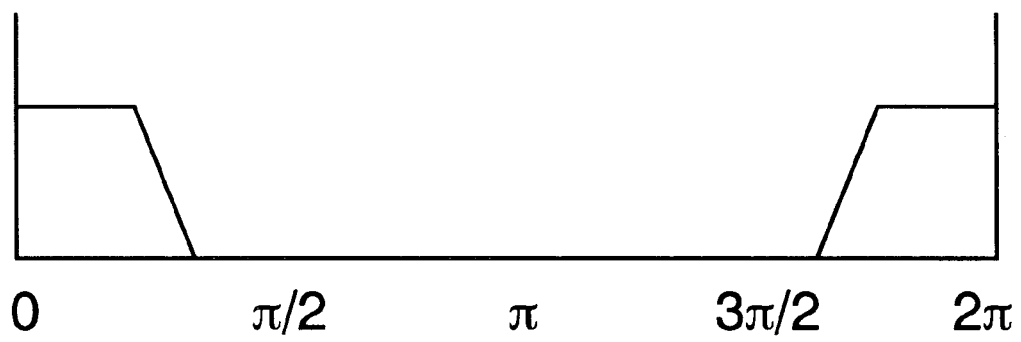
FIG. 2 is a diagram illustrating the frequency response of a known 4x low pass pulse shaping filter.
Figure 3:
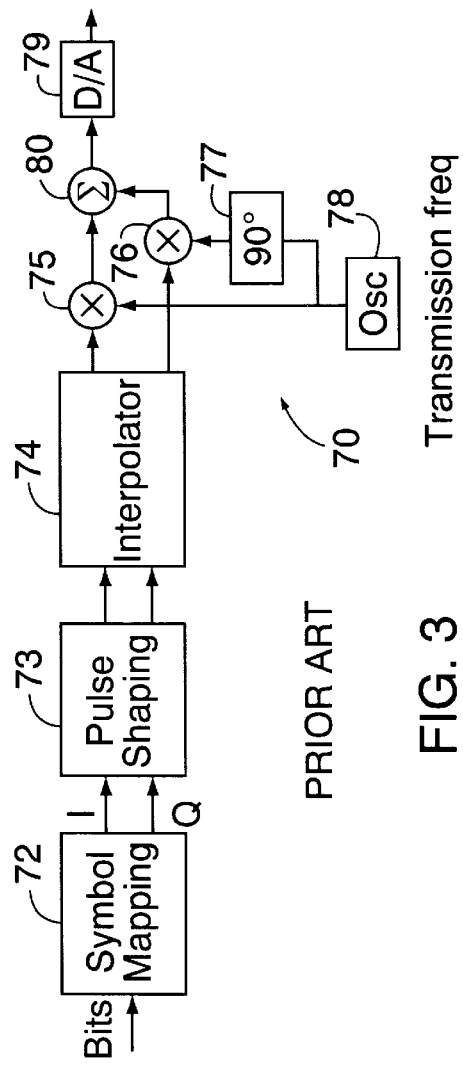
FIG. 3 illustrates a known modulator.
Figure 4:
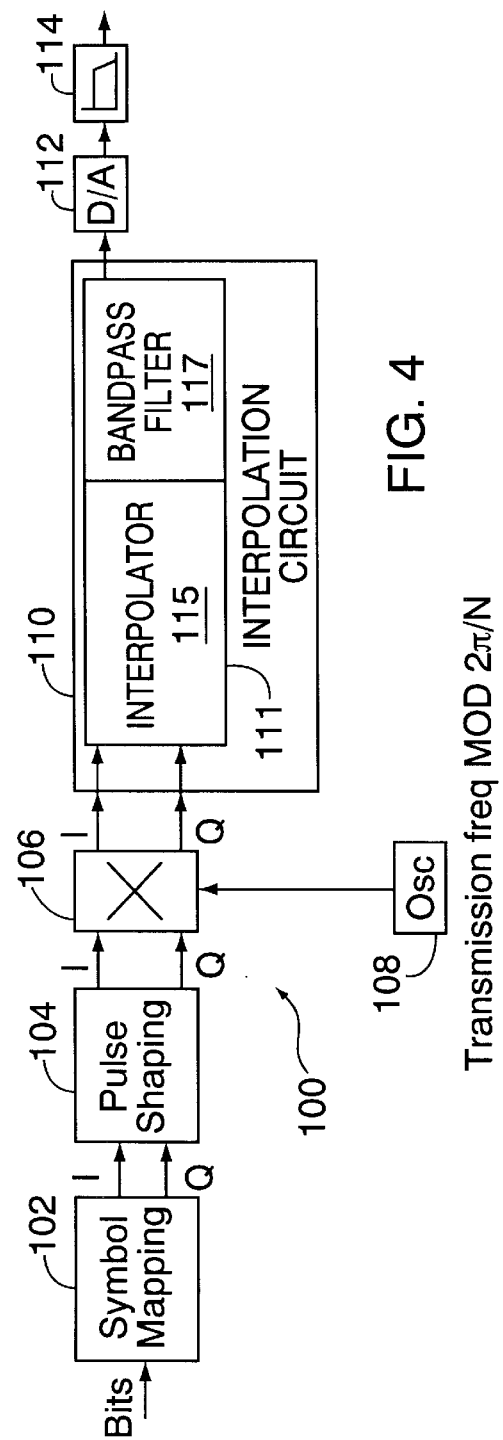
FIG. 4 illustrates a digital modulator implemented in accordance with the present invention.

Referring now to FIG. 4, there is illustrated a modulator 100 implemented in accordance with one embodiment of the present invention. The modulator 100 includes a symbol mapping circuit 102, a complex pulse shaping circuit 104, a complex mixer 106, an oscillator 108, an interpolation circuit 110, a D/A converter 112, and a low pass filter 114. The oscillator 108 may be, e.g., a numerically controlled oscillator which can be controlled via a control signal supplied thereto. The interpolation circuit 110 includes one or more stages 111, each stage including an interpolator 115, and a bandpass filter 117. While the interpolator 115 and bandpass filter 117 are illustrated as complex circuits, e.g., which process both real and imaginary signals, the use of complex circuits is not mandatory. In addition, it is possible to supply only the real output of the interpolation circuit 110 to the D/A converter if the quadrature phase signal is not required.

In accordance with the present invention, the information signal, e.g., digital bits of data, are supplied to the input of the symbol mapping circuit 102. The symbol mapping circuit 102 outputs in-phase (I) and quadrature (Q) phase signals which are supplied to corresponding inputs of the complex pulse shaping circuit 104. The I and Q outputs of the pulse shaping circuit 104 are supplied to corresponding I and Q inputs of the mixer 106.

In the embodiment illustrated in FIG. 4, the signal output by the oscillator 108 has a frequency which is equal to the transmission, i.e., ultimate carrier frequency, modulo the oscillator sampling rate. The complex mixer 106 mixes the output of the oscillator 108 with the I and Q signals output by the pulse shaping circuit 104. I and Q signals at the output frequency of the oscillator 108 are supplied to corresponding I and Q inputs of the interpolation circuit 110. The operation of the interpolator circuit 110 of the present invention will be described in greater detail below.

While, in the FIG. 4 embodiment, the input to the interpolation circuit is generated using digital circuitry, e.g., a digital mixer 106, the input signal could be generated using analog circuitry and then converted into a digital signal, e.g., just prior to the input to the novel interpolation circuit 110 of the present invention.

The output of the interpolation circuit 110 is a signal which has been shifted in frequency, in accordance with the present invention, from the relatively low output frequency of the oscillator 108 up to the final transmission frequency. In the illustrated embodiment, the output, e.g., the real portion of a complex output signal, of the interpolation circuit 110 is supplied to the input of the D/A converter 112. After being converted into an analog signal, the signal to be transmitted is lowpass filtered by the low pass filter 114 and then output for transmission purposes.

A simple form of interpolation by integer ratios can be used to implement the interpolator 115 of the interpolation circuit 110. This form of interpolation involves inserting zeros in between the output samples of the pulse shaping filter 104 and then filtering the padded signal. An artifact of the zero padding operation is the creation of signal images in the upsampled domain at intervals in digital frequency of $\pm 2\ \pi/N$, where N is an integer corresponding to the interpolation ratio.

Figure 5:
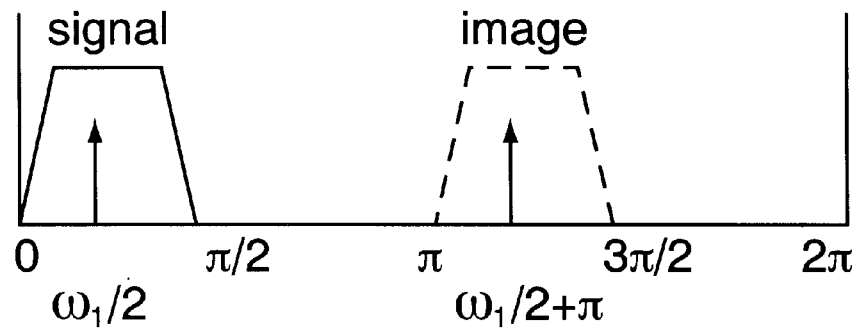
FIG. 5 illustrates the frequency response of a switch band interpolator circuit of the present invention.

In such an embodiment, if a signal is located at the frequency $\omega_1$ and zero padded for an interpolation by N=2, the signal will be located in the interpolated, i.e., upsampled, domain at $\omega_1/2$ and an image will appear at $\omega_1/2+\pi$. In accordance with the present invention, by using a bandpass filter 117 that selects the image rather than the original signal, the signal can be shifted by $\pi$ radians in the interpolated domain. Referring now to FIG. 5, the dotted line beneath the word image represents the use of a bandpass filter 117 to select the image in the interpolated domain and thereby achieve a shift in frequency.

In this manner, the interpolation circuit 110, can be used to place a signal on a carrier in the interpolated domain without the need to perform a mixing operation after the interpolation step is performed. Thus, the interpolation circuit 110 may be referred to as a band shifting interpolator because it achieves a shift in the carrier frequency. In such an embodiment, the output carrier is a function of the input carrier and the selected band of the interpolator, i.e., $$\omega_{out}=\omega_{in}/N+2\ \pi m/N,$$

where $0 \leq m < N$ and,
where m and N are integers.

Thus, in accordance with the present invention, a mixer 106 can be positioned after the pulse shaping filter 104 and ahead of the interpolation circuit 110 to precisely control the output carrier frequency. The modulator 100 of the present invention has the advantage of operating the multipliers needed to implement the mixer 106 at 1/Nth the output frequency. This is in sharp contrast to known modulators which require a mixer to compute the output at the full clock rate of the final carrier signal.

In order for an interpolation circuit 110 having an interpolation ratio of N to be able to independently select any of the signal images, N different bandpass filters would be required. In such an embodiment one of the N filters would be selected for use as the filter 117 at any given time. For large values of N, this can become quite burdensome.

One embodiment of the present invention is directed to a method of achieving large interpolation ratios by using a series of cascaded interpolation circuits as opposed to a single interpolation circuit. When using a series of interpolation stages, the ultimate interpolation ratio is the product of the ratios of the cascaded stages. Accordingly, it is possible to obtain a large interpolation value by using a series of interpolation circuits each of which has a relatively low interpolation value.

Figure 6:
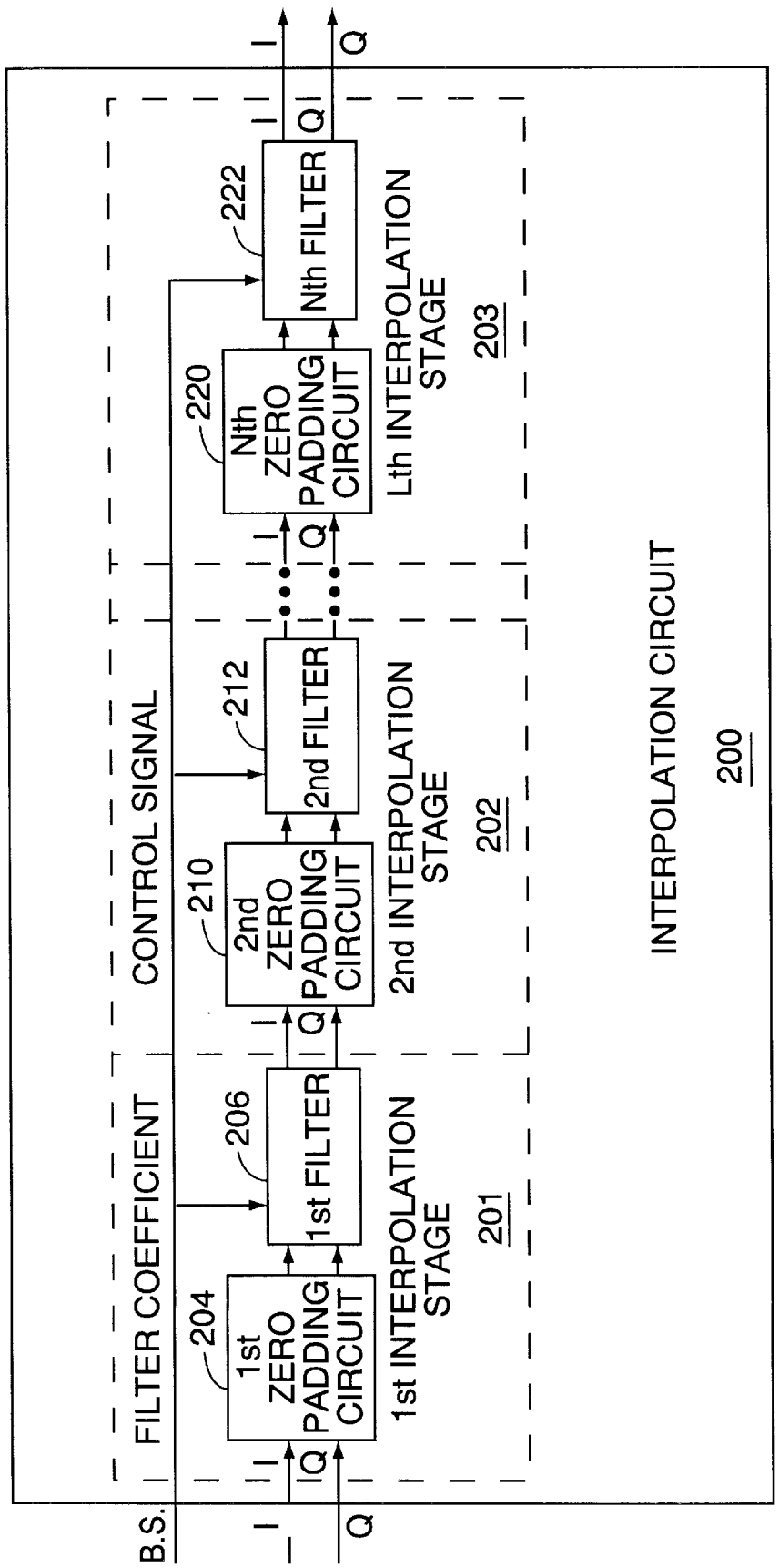
FIG. 6 illustrates an interpolation circuit of the present invention implemented as a series of cascaded interpolation stages.

Referring now to FIG. 6, there is illustrated an interpolation circuit 200 which is implemented as a series of L interpolation circuits or stages $S_0$ 201, $S_1$ 202, $S_{L-1}$ 203. Each of the first through $L^{th}$ interpolation stages comprises a zero padding circuit 204, 210, 220 and a passband filter 206, 212, 222. The $L^{th}$ interpolation stage 203 has its I and Q outputs coupled to a summer 223 which comprises an output circuit 207. The output of the summer 223 serves as the output of the interpolation circuit 200.

In the FIG. 6 embodiment, the ultimate interpolation value N is the product of the ratios of the L cascaded stages. If N is selected to be a power of 2 then it can be realized by cascading L 2× interpolation stages such that $N=2^L$. The interpolation circuit 200 can, in accordance with the present invention, be used to translate the signal output by the mixer 106 up to the output carrier frequency.

Figure 7:
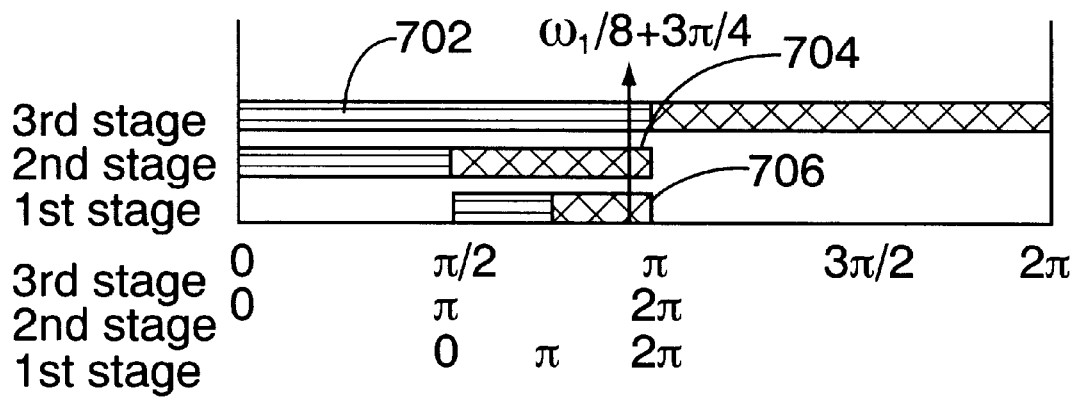
FIG. 7 illustrates the frequency band selection for a cascaded 8x interpolator used in accordance with one embodiment of the present invention.

In an embodiment of cascaded 2× interpolators, either the signal or its image is selected by using the filter 206, 212, 222 of each stage 201, 202, 203. In the case of 2× interpolation stages, the signal will be located in the upsampled frequency range of 0 to $\pi$ while the image will be located in the range of $\pi$ to 2 $\pi$. The determination of which frequency band, e.g., the signal or the image, is to be used at each stage 201, 202, 203 is determined by mapping the output carrier signal back through each interpolation stage. As shown in FIG. 7, which is an illustration of normalized frequency vs. signal amplitude, the output carrier is mapped to $\omega_{in}/8+3\ \pi/4$ for an 8× interpolation accomplished using three 2× stages. This is done by selecting the lower frequency band 702, e.g., the signal in the upsampled domain of the last stage, e.g., stage 203 and the upper frequency band 704, 706, e.g., the signal image in the upsampled domain of the first two stages, e.g., stages 201, 202. The selection process is achieved using the passband filter 206, 212, 222 included in each one of the three stages 201, 202, 203.

For purposes of design simplicity, it is desirable that all of the zero padding circuits 204, 210, 220 and filters 206, 212,

222 be of the same general hardware design. In accordance with the present invention, by changing coefficient filter values from filter to filter, a single filter design can be used for all of the filters 206, 212, 222. Changes in the filter coefficient values are used to achieve the necessary transfer function for any given filter 206, 212, 222.

Thus, the interpolation circuit 200 may be implemented using a series of virtually identical interpolation stages, each interpolation stage including, e.g., an identical zero padding circuit and a passband filter. One or more filter configuration control signals, e.g., filter band select (BS) signals, are supplied to each of the filter circuits 206, 212, 222 to control each individual filter's transfer function, e.g., by altering filter coefficient values.

The filter structure of a filter suitable for use as the filters 206, 212, 222 in an embodiment which uses 2× interpolation stages will now be discussed.

The interpolator filter for a 2× interpolator should have the characteristic of passing the signal at $\omega_{in}/2$ and stopping its image at $\omega_{in}/2+\pi$, or the exact opposite if the image is to be selected. If $\omega_{in}$ can range from [0, 2 $\pi$], then it is very difficult to design a single filter that can cover the entire range of the desired signal and stop the image as well. If the interpolated band is divided up into quarters, it is much easier to design a filter which can pass one quarter of the band and stop one quarter of the band $\pi$ radians away.

Figure 8:
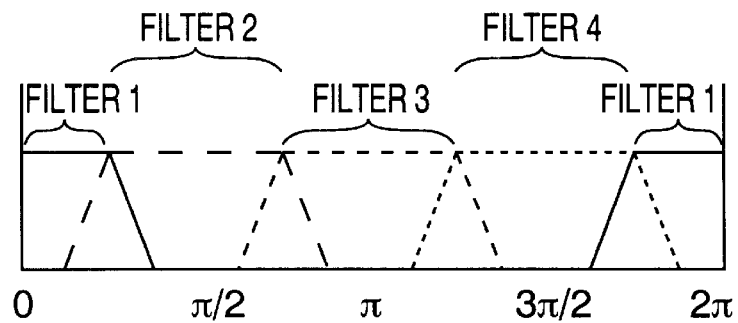
FIG. 8 illustrates the frequency response of quarter band filters used in one embodiment of the present invention.

A quarter band filter having a pass band of 0 to $\pi/4$ and 7 $\pi/4$ to 2 $\pi$, and a stop band of 3 $\pi/4$ to 5 $\pi/4$ makes a suitable interpolation filter for a signal with $\omega_{in}$ in the range of 3 $\pi/2$ to 2 $\pi$ since $\omega_{out}=\omega_{in}/2$ after 2× interpolation. By shifting such a filter in frequency so that it is centered on 0, $\pi/2$, $\pi$, and 3 $\pi/2$ then this single filter design can be used to completely cover the interpolated spectrum. FIG. 8 shows the passbands for four quarter-band filters, i.e., Filter 1, Filter 2, Filter 3, and Filter 4 which are centered at 0, $\pi/2$, $\pi$, and 3 $\pi/2$, respectively. The passband for each of the four filters is represented using lines with differing amounts of discontinuities. The pass band of Filter 1 is represented using solid lines while the passband of Filter 4 is represented using lines with the greatest number of discontinuities.

Each quarter-band filter, Filter 1, Filter 2, Filter 3, Filter 4, has a relatively wide transition skirt corresponding to relatively few taps. Because each filter has a flat passband, a signal can be placed in any of the quarter bands without linear distortion and with very low crosstalk into the filter pi radians away. This effectively reduces or eliminates aliasing in the upconversion process.

The first of the four low pass filters having the frequency characteristics illustrated in FIG. 8, e.g., Filter 1, can be implemented with real valued coefficients. The shifted filters, e.g., Filters 2, 3, and 4, can be implemented using the same general hardware as Filter 1, but different filter coefficients. The filter coefficients for Filters 2–4 can be created by multiplying each of the first through $m^{th}$ coefficients of the Filter 1 embodiment with the corresponding one of the first though $m^{th}$ values from the respective one of the following repeating sequences:

Filter 2 shift=$e^{jm\ \pi/2}$; coeff. multipliers={1, j, −1, −j, 1, . . . }

Filter 3 shift=$e^{jm\ \pi}$ coeff. multipliers={1, −1, 1, −1, . . . }

Filter 4 shift=$e^{j3m\ \pi/2}$ coeff. multipliers={1, −j, −1, j, . . . }

Filters 2, 3, 4, will differ from the original filter, Filter 1, by the sign of some coefficients and whether they are real valued or imaginary. They can be realized from the original filter by simply changing the structure of the filter adder tree through the use of multiplexers to thereby re-configure the filter.

Figure 9:
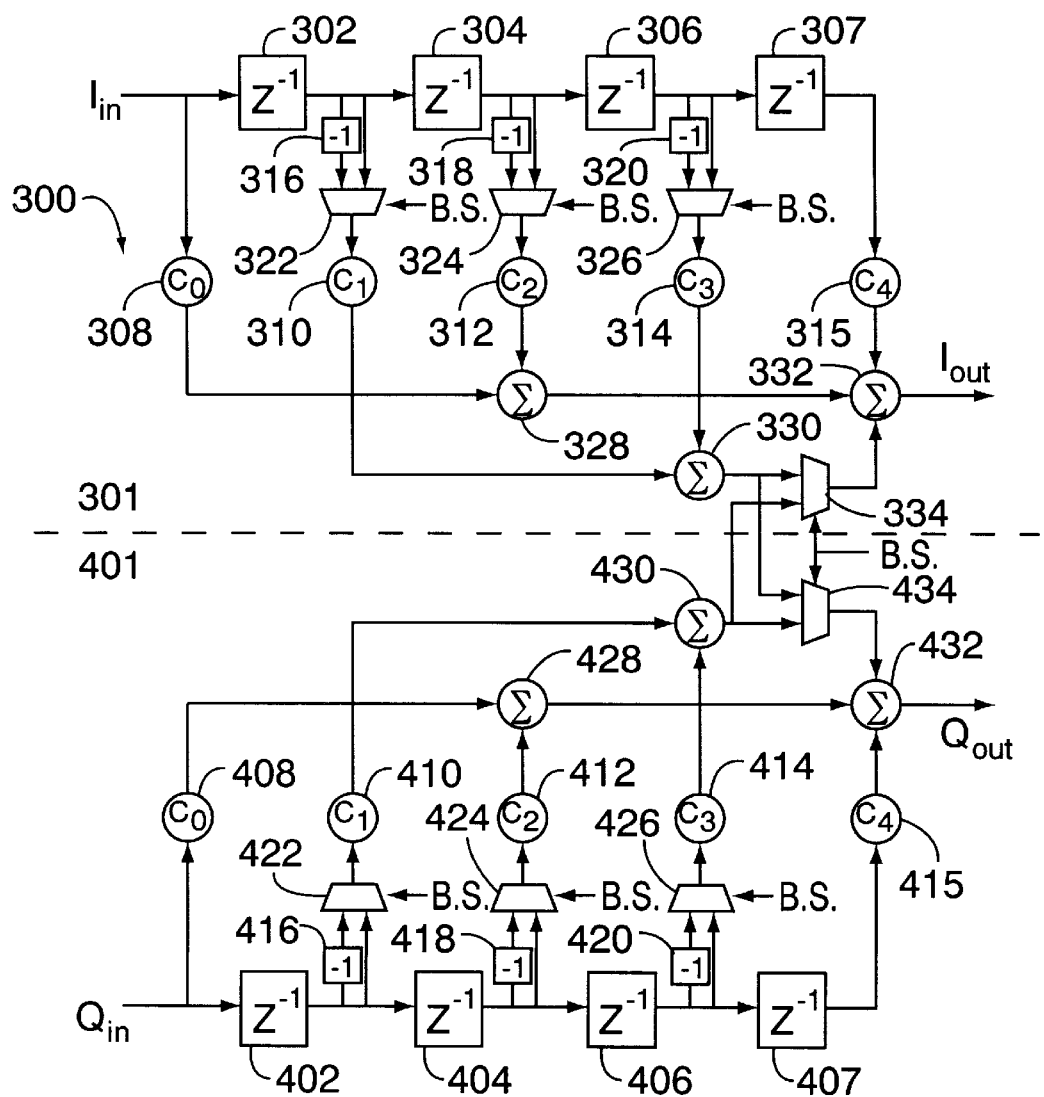
FIG. 9 illustrates an exemplary 4 Tap pass band filter suitable for use in one embodiment of the interpolator of the present invention.

A four tap complex filter 300, which may be used as any one of the L bandpass filters 206, 212, 222, to provide any one of the filter transfer functions illustrated in FIG. 8, is illustrated in FIG. 9. By controlling the value of the filter coefficients via the BS (filter band select) signal, the passband of the filter can be placed at the appropriate location as may be required to implement any of the filters 206, 212, 222.

Because the selection of the required transfer function for a filter can be achieved by the inversion or non-inversion or interpretations of filter coefficients as real or imaginary, the design of the L filters 206, 212, 222 can be treated as the design of a single quarter-band filter. This single filter design can be optimized and simplified as much as possible using, e.g., canonical signed digit (CSD) design.

The filter 300 comprises first and second filter segments 301, 401 which are generally identical but for the fact that the first filter segment 301 is used to process the real portion of the complex signal supplied to the filter 300 and the second filter segment 401 is used to process the imaginary portion of the complex signal.

The first filter segment 301 comprises first through fourth unit delay elements 302, 304, 306, 307, first through third −1 multipliers 316, 318, 320, first through fourth multiplexers 322, 324, 326, 334, first through fifth multipliers 308, 310, 312, 314, 315 and first through third summers 328, 330, 332.

Because of the similarity between the first filter segment 301 and the second filter segment 401, the second filter segment 401 will not be described in detail. However, it should be noted that the second filter segment 401 comprises the same general elements as the first filter segment 301.

Referring once again to filter segment 301 of FIG. 9, it can be seen that real portion of the signal to be filtered is supplied as an input to the first unit delay element 302 and to the first multiplier 308. The first multiplier 308 multiplies the input signal by the first filter coefficient value $C_0$. The output of the first multiplier 308 is supplied to a first input of the first summer 328.

The output of the first unit delay element 302 is coupled to the input of the first −1 multiplier 316, a second input of the first multiplexer 322 and the second unit delay element 304. The first multiplexer 322 receives as inputs the output of the first unit delay element 302, the output of the first −1 multiplier 316, and the BS signal which is used to control which one of the two inputs is supplied to the output of the first multiplexer 322. In the illustrated embodiment the BS signal may be a different two bit control signal for each stage of the interpolation circuit. The output of the first multiplexer 322 is supplied to the input of the second multiplier 310 to be multiplied by the second coefficient $C_1$ prior to being supplied to a first input of the second summer 330.

In a similar fashion, the output of the second unit delay element 304 is coupled to the input of the second −1 multiplier 318, a second input of the second multiplexer 324, and the third unit delay element 306. The second multiplexer 324 receives as inputs the output of the second unit delay element 304, the output of the second −1 multiplier 318, and the B.S. signal which is used to control which one of the two inputs is supplied to the output of the second multiplexer 324. The output of the second multiplexer 324 is supplied to the input of the third multiplier 312 to be multiplied by the third coefficient $C_2$ prior to being supplied to a second input of the first summer 328.

The output of the third unit delay element 306 is coupled to the input of the fourth unit delay element 307, the third −1 multiplier 320, and a second input of the third multiplexer 326. Thus, the third multiplexer 326 receives as inputs the output of the third unit delay element 306, the output of the third −1 multiplier 320, and the BS signal which is used to control which one of the two inputs is supplied to the output of the third multiplexer 326. The output of the third multiplexer 326 is supplied to the input of the fourth multiplier 314 to be multiplied by the fourth coefficient $C_3$ prior to being supplied to a second input of the second summer 330.

The output of the fourth unit delay element 307 is coupled to the input of the fifth multiplier 315. In this manner, the output of the fourth unit delay element 307 is multiplied by the fifth coefficient $C_4$ prior to being supplied to an input of the third summer 332.

The output of the second summer 330 is coupled to a first input of the fourth multiplexer 334 of the first filter segment 301 and to a first input of the fourth multiplexer 434 of the second filter segment 401. A second input of the fourth multiplexer 334 is coupled to the output of the second summer of the second filter segment 401. The BS signal is used to control which one of the two input signals the fourth multiplexer 334 will output to the third summer 332.

The third summer 332 receives and sums the signal generated by the first summer 328, the signal output by the fourth multiplexer 334, and the signal output by the fifth multiplier 315 to generate the real (I) output signal generated by the filter circuit 300.

Figure 10:
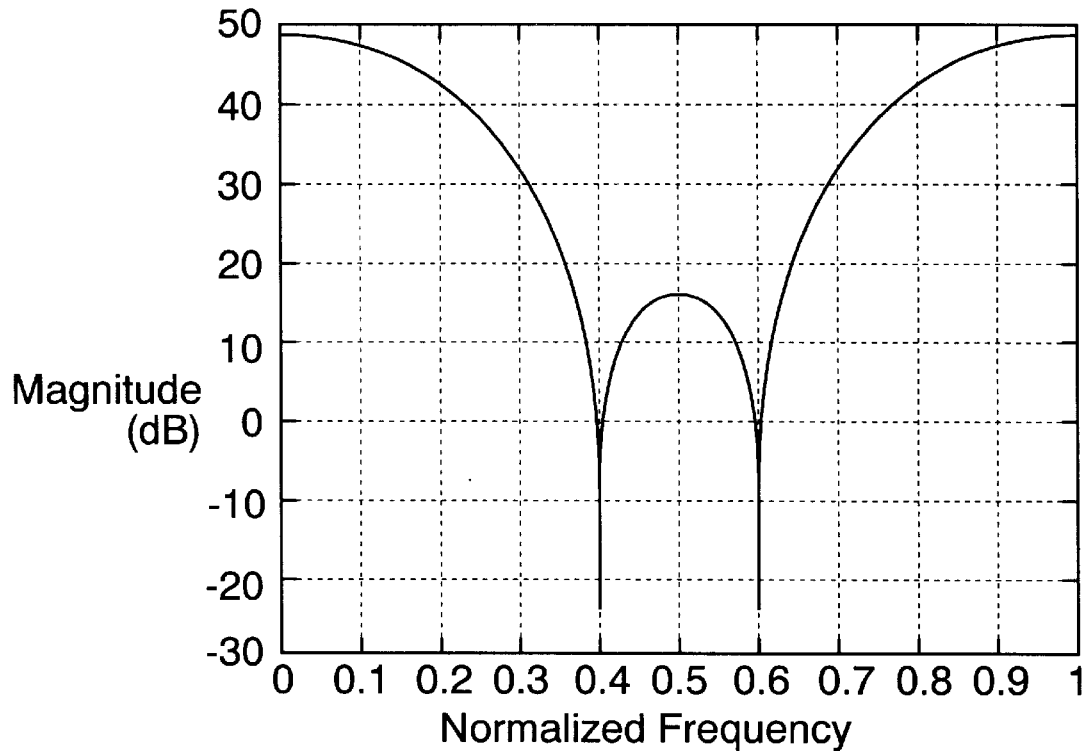
FIGS. 10–13 illustrate the normalized frequency response of passband filters used as part of an interpolation circuit in accordance with one exemplary embodiment of the present invention.

The transfer function for a bandpass four tap filter of the type illustrated in FIG. 9 having coefficient values $C_0$=15, $C_1$=71, $C_2$=106, $C_3$=71, $C_4$=15, is illustrated in FIG. 10. The transfer function for this filter as expressed using Z transforms, is $H(z)=15+71\ z^{-1}+106\ z^{-2}+71\ z^{-3}+15\ z^{-4}$. Such a bandpass filter is suitable for use as a 2× interpolator filter.

Figure 11:
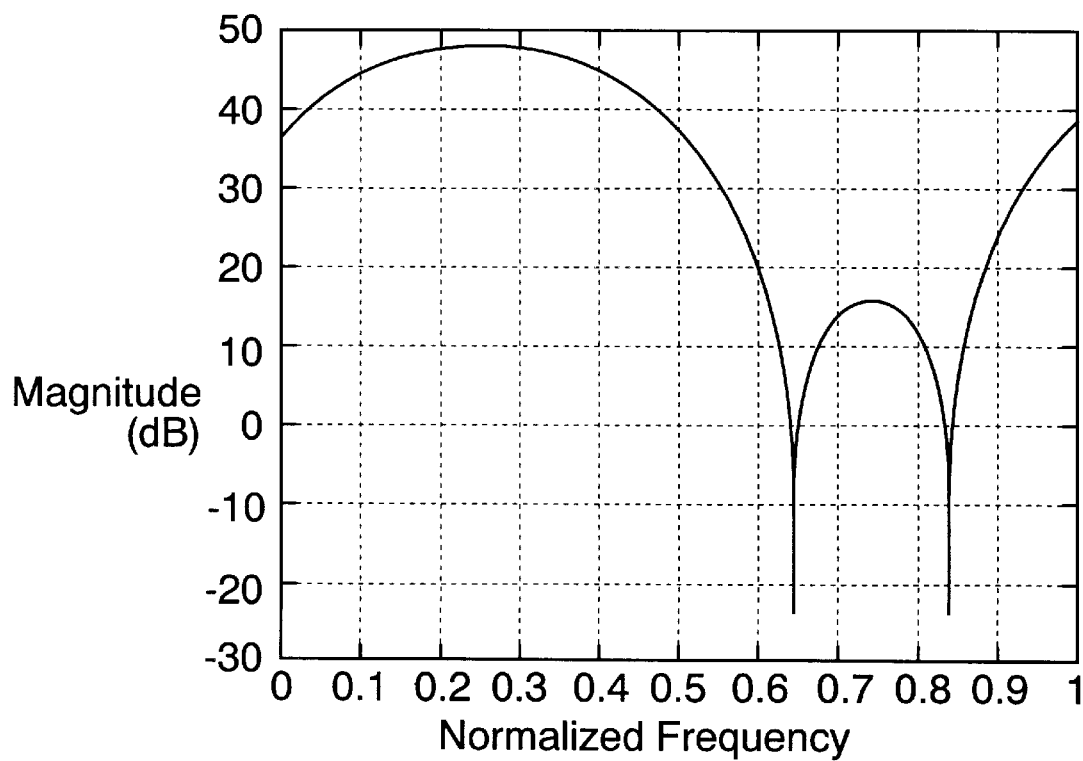

The filter of FIG. 9 may be transformed into a filter having the center of the passband located at π/2 by merely multiplying the coefficients by the sequence {1, j, −1, −j, 1}. Such an operation can be performed by controlling the first through fourth multiplexers 322, 422, 324, 424, 326, 426 and 334, 434 of the first and second filter segments 301, 401 through the use of the BS signal. The transfer function $H(z)=15+j71\ z^{-1}-106\ z^{-2}-71\ jz^{-3}+15\ z^{-4}$ is illustrated in FIG. 11.

Figure 12:
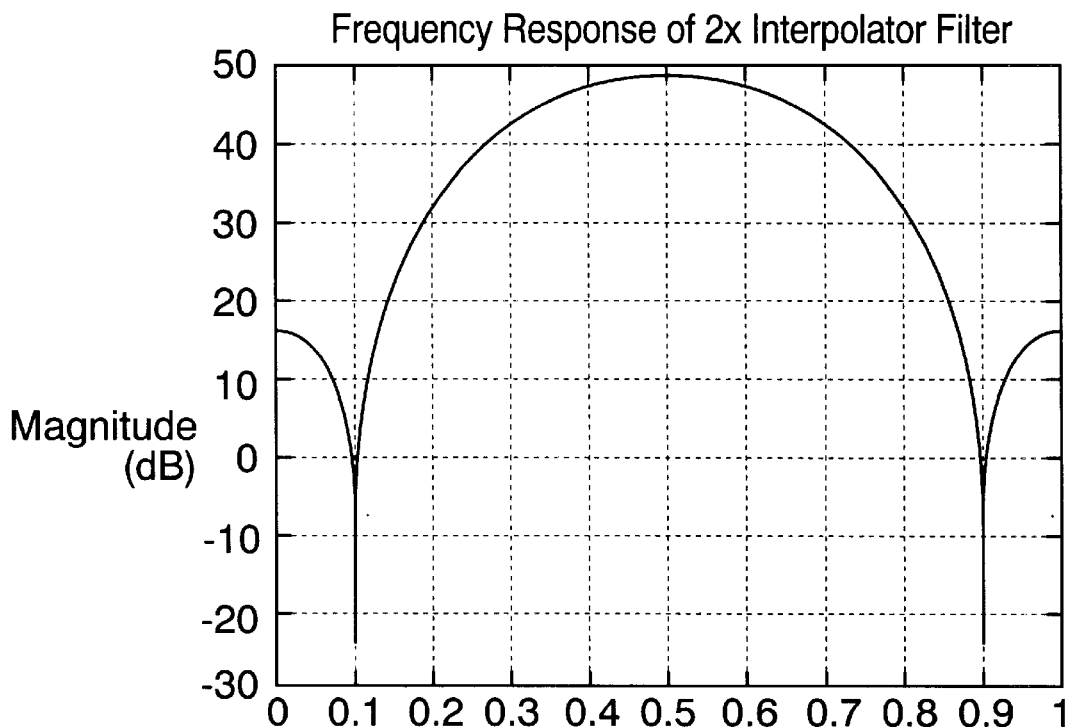

Similarly, the filter of FIG. 9 may be transformed into a filter having the center of the passband located at π by merely multiplying the coefficients by the sequence {1, −1, 1, −1, 1}. Such an operation can be performed by controlling the first through fourth multiplexers 322, 422, 324, 424, 326, 426 and 334, 434 through the use of the B.S. signal. The resulting transfer function $H(z)=15-71\ z^{-1}+106\ z^{-2}-71\ z^{-3}+15\ z^{-4}$ is illustrated in FIG. 12.

Figure 13:
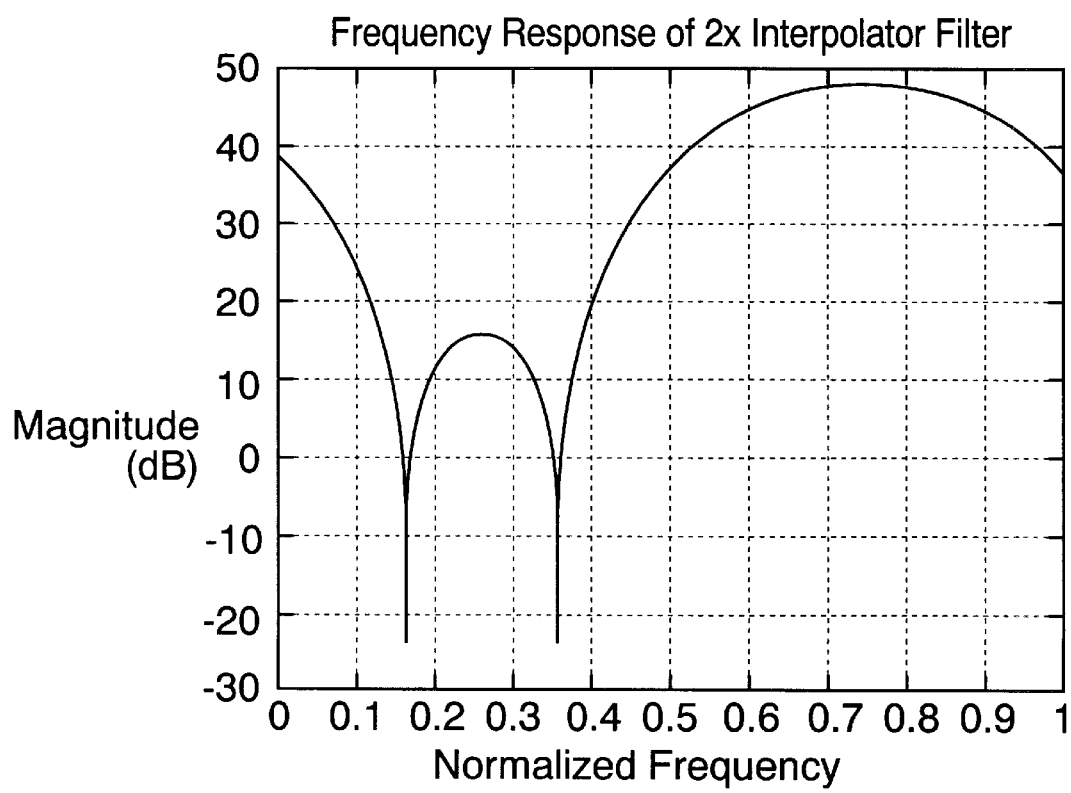

The filter of FIG. 9 may also be transformed into a filter having the center of the passband located at 3 π/2 by merely multiplying the coefficients by the sequence {1, −j, −1, j, 1}. Once again, such an operation can be performed by controlling the first through fourth multiplexers 322, 422, 324, 424, 326, 426 and 334, 434 through the use of the B.S. signal. The resulting transfer function $H(z)=15-71\ jz^{-1}-106\ z^{-2}+71\ jz^{-3}+15\ z^{-4}$ is illustrated in FIG. 13.

In the above described manner it is possible to use a single filter design to implement the filter circuits 206, 212, 222 of the interpolation circuit 200 with control signals, e.g., the BS signal, being used to determine the transfer function of the individual filters 206, 212, 222.

In the cascaded interpolation stage embodiment of the present invention, e.g., as illustrated in FIG. 6, the output of any interpolation stage 201, 202, 203 can be used as the final interpolation stage. Thus, the cascade interpolator 200 is really a family of interpolator stages 201, 202, 203 with a selectable interpolation ratio. When each interpolation stage 201, 202, 203 is a 2× interpolation stage, the output interpolation ratio can be made selectable. The output interpolation ratio can be any value corresponding to $2^X$ where X is selected to be any value from 1 to L and where L represents the total number of 2× interpolation stages 201, 202, 203.

Figure 14:
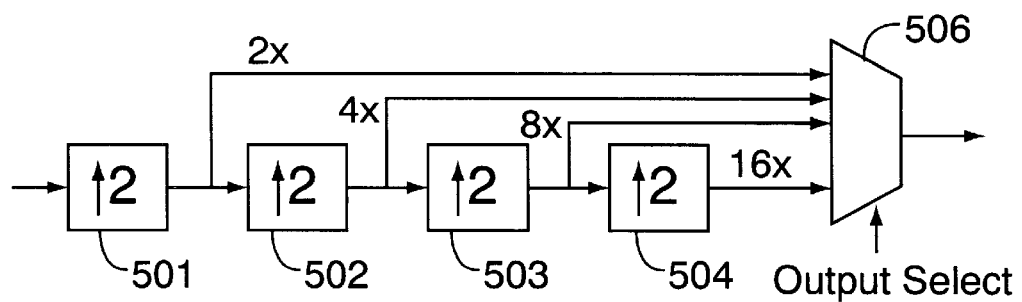
FIGS. 14 and 15 illustrate circuitry suitable for use in implementing interpolation circuits including a series of cascaded interpolation stages, in accordance with various embodiments of the present invention.

Referring now to FIG. 14, there is illustrated a cascade arrangement of four 2× interpolation stages 501, 502, 503, 504 which may be the same as or similar to the stages 201, 202, 203 of FIG. 8. The input to the first 2× interpolation stage 501 is the signal to be interpolated. The output of each 2× interpolation stage, with the exception of the last 2× interpolation stage is coupled to the next 2× interpolation stage and to an input of the multiplexer 506. The output of the last 2× interpolation stage 504 is coupled to the input of the multiplexer 506 but not to an input of another interpolation stage.

The multiplexer 506 is controlled by way of an output select signal supplied thereto. The multiplexer 506 can be used to select the output of any one of the interpolation stages as the output of the cascade arrangement of interpolation stages and to thereby control the overall amount of interpolation. In such an embodiment, it is expected that each interpolation stage 501, 502, 503, 504 will be implemented to operate at a clock rate which is the output clock rate divided by the amount of interpolation between the current stage and the ultimate output. Thus, when the interpolation rate is changed via selecting the output of an interpolation stage 501, 502, 503 which is different from the final interpolation stage 504, the output rate will be reduced to the clock rate of the interpolation stage selected to provide the output signal.

An alternate arrangement for selecting the interpolation ratio is to multiplex the inputs of each interpolation stage to select between the output of the previous stage or the overall interpolator input. Such an embodiment is illustrated in FIG. 15.

Figure 15:
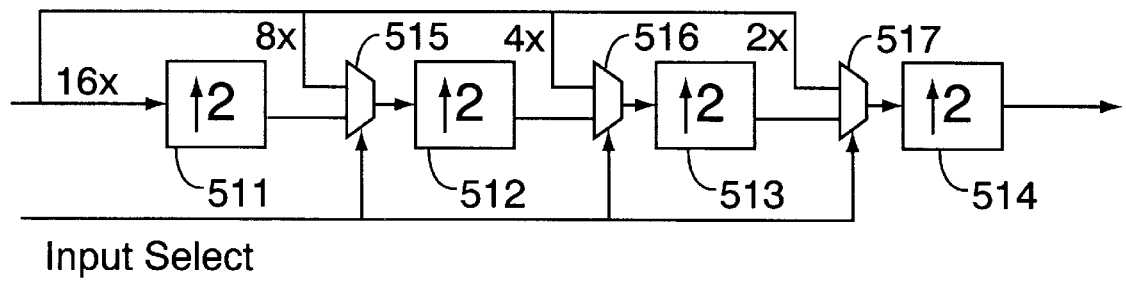

As illustrated in FIG. 15. the input to the first interpolation stage 511 is supplied to a first through third multiplexer 515, 516, 517. The first multiplexer 515 is located between the first interpolation stage 511 and the second interpolation stage 512. The second multiplexer 516 is located between the second and third interpolation stages 512, 513 and the third multiplexer 517 is located between the third and fourth interpolation stages 513, 514. By supplying an input control signal to the multiplexers 515, 516, 517, the inputs to each stage can be controlled to be either the input to the first interpolation stage or to be the output from the previous interpolation stage.

The FIG. 15 embodiment has the advantage of allowing the input rate of the interpolator to be increased and the interpolation rate decreased with the output clock rate being maintained at the design maximum.

It should be noted that the inputs and outputs of the interpolation stages in the embodiments of FIGS. 14 and 15 can be complex signals.

As discussed above, FIG. 8 shows the frequency response of quarter band filters used in one embodiment of the present invention. One method for selecting one of a number of possible quarter band filter transfer functions for removing image signals during the upsampling process is to use a filter 300 whose taps are configurable as has been described above.

Figure 16:
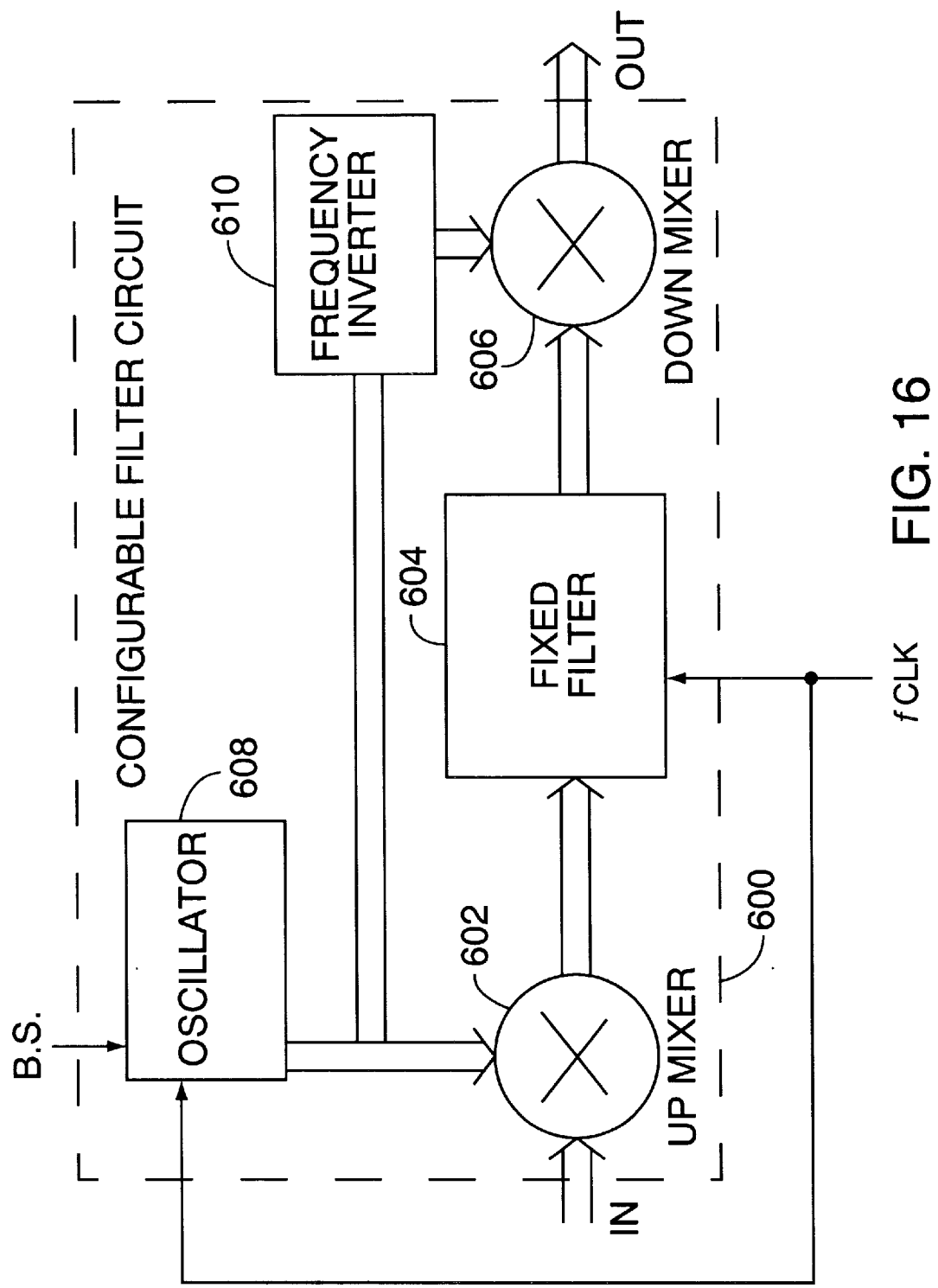
FIGS. 16, 17 and 18 illustrate configurable filter circuits implemented in accordance with various exemplary embodiments of the present invention.

Another method for selecting a particular filter configuration is by using a fixed filter and then shifting the frequency of the signal that is supplied to, and then output from, the fixed filter. Such an embodiment is illustrated in FIG. 16. As illustrated in FIG. 16, the configurable filter circuit 600 comprises a first mixer 602, a fixed filter 604, a second mixer 606, an oscillator 608 and a frequency inverter circuit 610. For purposes of explanation the first mixer 602 will be referred to as an up mixer since it introduces a frequency shift into the signal supplied to the configurable filter circuit 600. The configurable filter circuit 600 also receives as an input signal, the band select signal. This signal is used to control the oscillator 608 which generates, as a function of the BS (band select) signal, a complex output signal. The oscillator's complex output signal is used, by the up mixer 602 to shift the frequency of the input signal before the filtering operation is performed. In addition, the oscillator's complex output signal is supplied to the frequency inverter circuit 610. The frequency inverter circuit 610 generates the inverse frequency of the complex oscillator output signal. That is, it reverses the rotational sense of the complex signal, e.g., by swapping the real and imaginary components of the complex oscillator output signal or by, e.g., taking the complex conjugate of the complex oscillator output signal. For exemplary purposes the frequency inverter 610 will be discussed in terms of a complex conjugate embodiment which generates the conjugate of the complex oscillator output signal.

The generated conjugate of the complex oscillator output signal is supplied to an input of the down mixer 606. The down mixer 606 also receives the output of the fixed filter 604. The down mixer 606 effectively reverses the frequency shift introduced into the carrier signal by the up mixer 602. By shifting the carrier signal's frequency in response to a control signal, filtering the signal, and then reversing the frequency shift, the ability to change the transfer function of the configurable filter circuit 600 is achieved despite the use of the fixed filter 604.

The fixed filter 604 may be implemented, e.g., as a single low pass filter having real filter coefficients to achieve a filter transfer function which is the same as, or similar to, the one represented by the use of a solid line in FIG. 8. The fixed filter 604 can be implemented as two independent filters acting separately upon (I) in-phase and (Q) quadrature phase signal components. In such an embodiment, each of the I and Q filters will have real coefficients and will process real data.

In one embodiment, at the input of the fixed filter 604, the input signal is shifted in frequency, using the up mixer 602, by 0, $\pi/2$, $\pi$, or 3 $\pi/2$ radians, with the filter sampling rate fclk representing 2 $\pi$ radians. The signal output by the fixed filter 604 is then shifted in frequency in the opposite direction by the down mixer 606 such that there is no net frequency shifting between the input and output of the configurable filter circuit 600.

An advantage of this method of implementing a configurable filter circuit 600 is that it requires that the frequency shifting operations be performed only at the input and output of the fixed filter 604 regardless of the number of taps in the filter 604, i.e., the filter coefficients of multiple taps need not be changed.

It should be noted that embodiments of the type illustrated in FIG. 16 are particularly easy to implement where the frequency shifting is limited to 0, $\pi/2$, $\pi$, or 3 $\pi/2$ radians per sample, since this involves rotations at each sample of 0, $\pi/2$, $\pi$, or 3 $\pi/2$ radians, which can be achieved using combinations of multiplexers and inverters.

Figure 17:
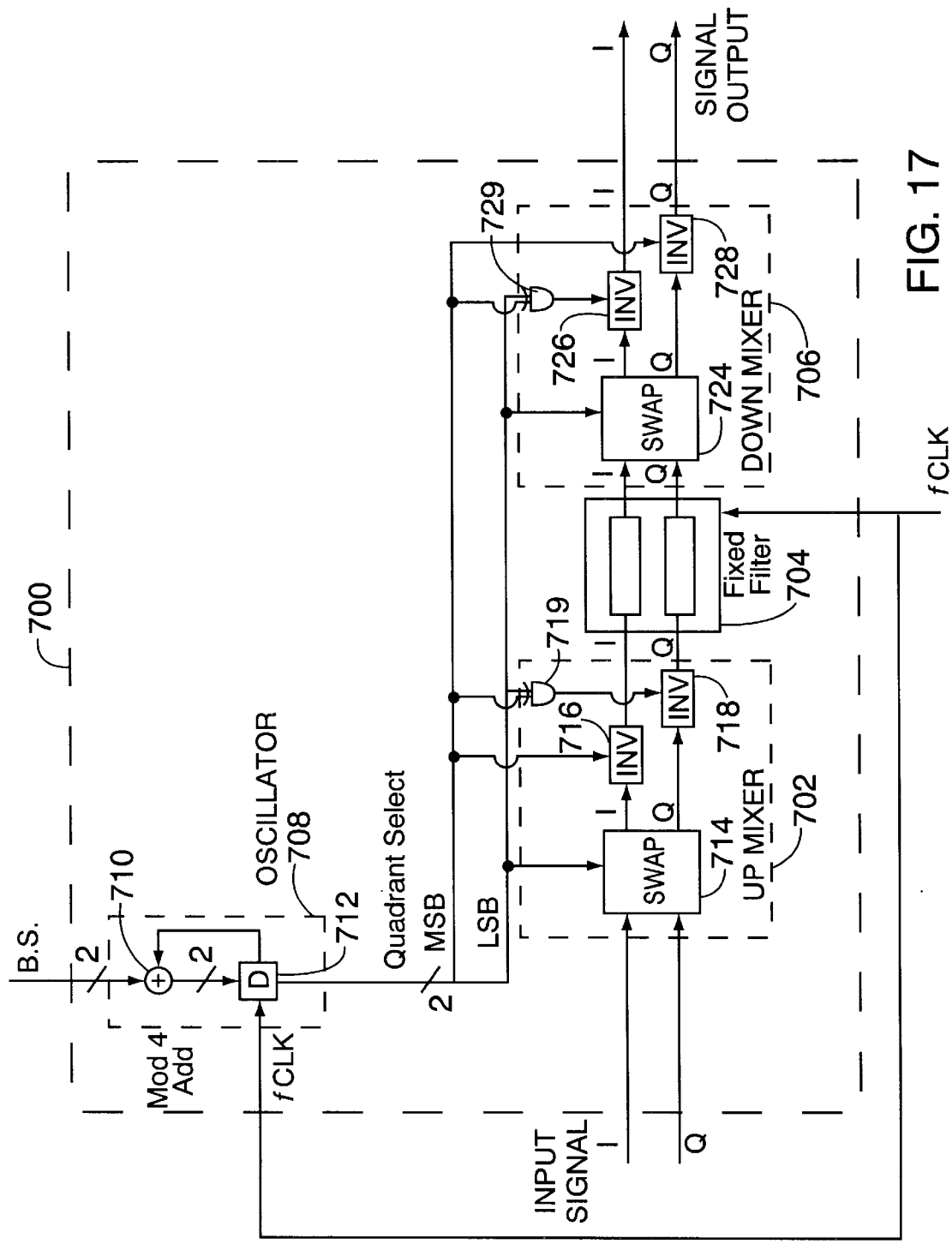

A configurable filter circuit 700 including a fixed filter 704, oscillator 708 and mixers 702, 706 for shifting a complex signal by 0, $\pi/2$, $\pi$, or 3 $\pi/2$ radians per sample, is illustrated in FIG. 17.

In FIG. 17, the oscillator 708 is implemented using a MOD 4 adder 710 which receives two bits from the BS signal as a first input and a two bit feedback signal from the output of a delay element 712 as a second input. The MOD 4 adder adds the first and second signals and outputs the lowest first two bits of the resulting binary value. The output of the Mod 4 adder is supplied to the input of the delay element 712. The delay element 712 outputs a two bit quadrant select signal which is used to control the mixers 702, 706.

Each of the mixers 702, 706 comprises a swap circuit 714, 724 and first 716, 726 and second 718, 728 controllable inverters, respectively. Each of the swap circuits 714, 724 are used for receiving the I and Q components of the signal being filtered and for interchanging these signals in response to the output of the oscillator 708. Each of the first 716, 726 and second 718, 728 controllable inverters are used in response to control signals derived from the output of the oscillator 708 to invert the signals supplied thereto.

In the case of the up mixer 702, the swap circuit 714 is controlled by the least significant bit (LSB) of the quadrant select signal. In response to this signal, the swap circuit 714 either passes the I and Q signals received at its inputs, to its corresponding outputs or performs a signal swap by redirecting the I input signal to the Q output and the Q input signal to the I output.

The I signal output of the swap circuit 714 is coupled to the signal input of the first inverter 716. In a similar manner, the Q signal output of the swap circuit 714 is coupled to the signal input of the second inverter 718. The first inverter 716 has a control input for receiving the MSB (most significant bit) of the quadrant select signal.

An exclusive or gate 719 which receives both the LSB and MSB quadrant select signal bits as inputs generates an output signal which is used to control the second inverter 718. Accordingly, as illustrated in FIG. 17, the output of the exclusive OR gate 719 is coupled to the control input of the second inverter 718.

In response to an asserted control signal, the individual inverters 716, 718 invert the received signal. Otherwise, the individual inverters 716, 718 output the received signal without inverting it. The output of the first inverter 716 is the I signal. This signal is supplied to the I input of the fixed filter 704. The output of the second inverter 718 is the Q signal. This signal is supplied to the Q signal input of the fixed filter 704.

The second mixer, 706 is similar in design to the first mixer 702. The swap circuit 724 of the down mixer 706 receives the I and Q signals output by the fixed filter as its signal inputs. As control inputs, the down mixer 706 receives the MSB and LSB of the quadrant select signal. Unlike the up mixer 702, the control input to the first inverter 726 is generated by the use of the exclusive OR gate 729 which receives both the MSB and LSB of the quadrant select signal at its inputs. The second inverter 728 receives the MSB of the quadrant select signal as its input.

Through the use of the exclusive OR gates 719, 729, it is insured that the complex conjugate of the signal, mixed with the input signal by the up mixer 702, will be mixed with the filtered signal output by the fixed filter 704.

The operation of the circuitry, i.e., oscillator 708, up mixer 702, and down mixer 706 for shifting a complex signal by 0, $\pi/2$, $\pi$, or 3 $\pi/2$ radians per sample, illustrated in FIG. 17, will now be described. In accordance with the embodiment illustrated in FIG. 17, the number of quadrants per sample (0, 1, 2, or 3) to be shifted in frequency is represented by the two bits of the BS signal. These two bits are input as a phase increment to the phase accumulator formed by the two-bit modulo adder 710 and delay element 712. The oscillator 708 can be thought of as a quadrant accumulator which is clocked once per sample so that its output represents the number of quadrants that the current input sample must be rotated.

The process of rotating a signal at the input of the fixed filter 704 involves:

(0 rotation; Q.S.=00): I→I; Q→Q; (no swap, no invert)
(1 quadrant; Q.S.=01): I→Q; Q→-I (swap, invert Q)
(2 quadrant; Q.S.=10): I→-I; Q→-Q; (no swap; invert I and Q)
(3 quadrant; Q.S.=11): I→-Q; Q→I; (swap, invert I)

The signal rotating process in achieved by using the controllable swap and invert modules 714, 716, 718, 724, 726, 728 that form the mixers 702, 706. Note how, as discussed above, the control logic is slightly different in the up and down mixers 702, 706 to insure that the inverse of the signal rotation applied at the input of the fixed filter 704 is applied at the output of the filter 704.

The filter circuit 700 illustrated in FIG. 17, has the same input and output clock rate. In accordance with one embodiment of the present invention, the configurable filter circuit 700 is used in an upsampling interpolator system with configurable filters of the type illustrated in FIG. 6. In such an embodiment, configurable filters 700 are substituted for the $1^{st}$ through $N^{th}$ filters 206, 212, 222 each of which follow a zero padding circuit 204, 210, 220. In such a case if the signal being processed is to be upconverted by a factor of two, then the zero padding circuit 204, 210, 220 will cause every other sample in the signal being supplied to the configurable filter circuit 700 to be a zero. In such a case, the configurable filter circuit 700 can be simplified so that it shifts by zero or it radians for each non-zero sample and performs no shifting for each zero valued sample. Thus, the up and down shifters 702, 706 need only shift by zero or π radians per non-zero sample. To do this, no swapper circuit is required. To shift by 0 or π radians per sample a mixer need only pass or invert the received I and Q signals.

Figure 18:
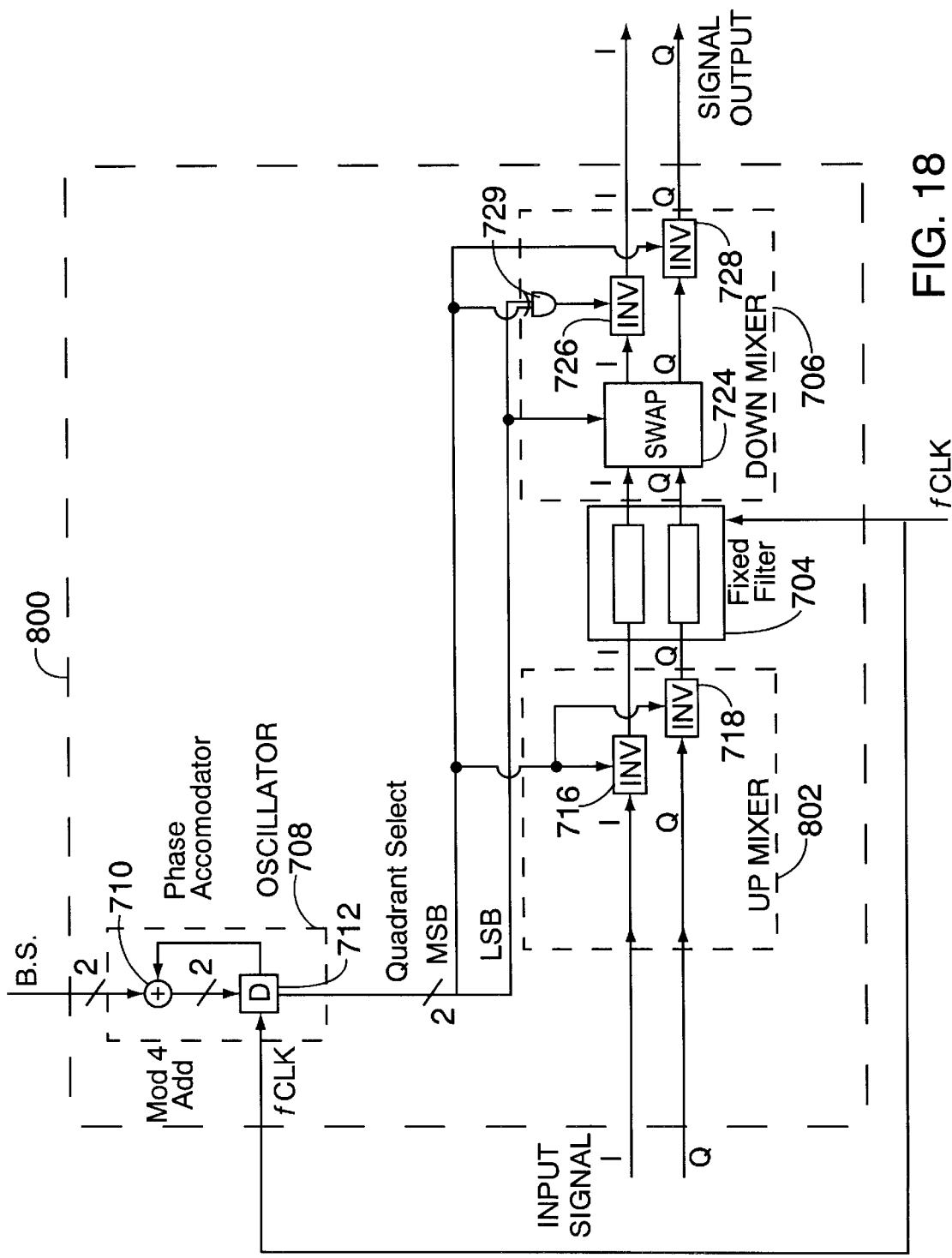

FIG. 18 illustrates a configurable filter circuit 800 suitable for use following a zero padding operation that results in every other sample being a zero. Circuitry which is the same as or similar to circuitry previously described in regard to FIG. 17 bears the same reference numbers and, for the sake of brevity will not be described again in detail.

The configurable filter circuit 800 comprises an oscillator 708, up mixer 802, fixed filter 704 and down mixer 706. Note that the up mixer is implemented using two inverter circuits 716, 718. As illustrated, no swap circuit is required in the up mixer 802 since the frequency shift at the input need only be zero or n radians per non-zero symbol.

Figure 19:
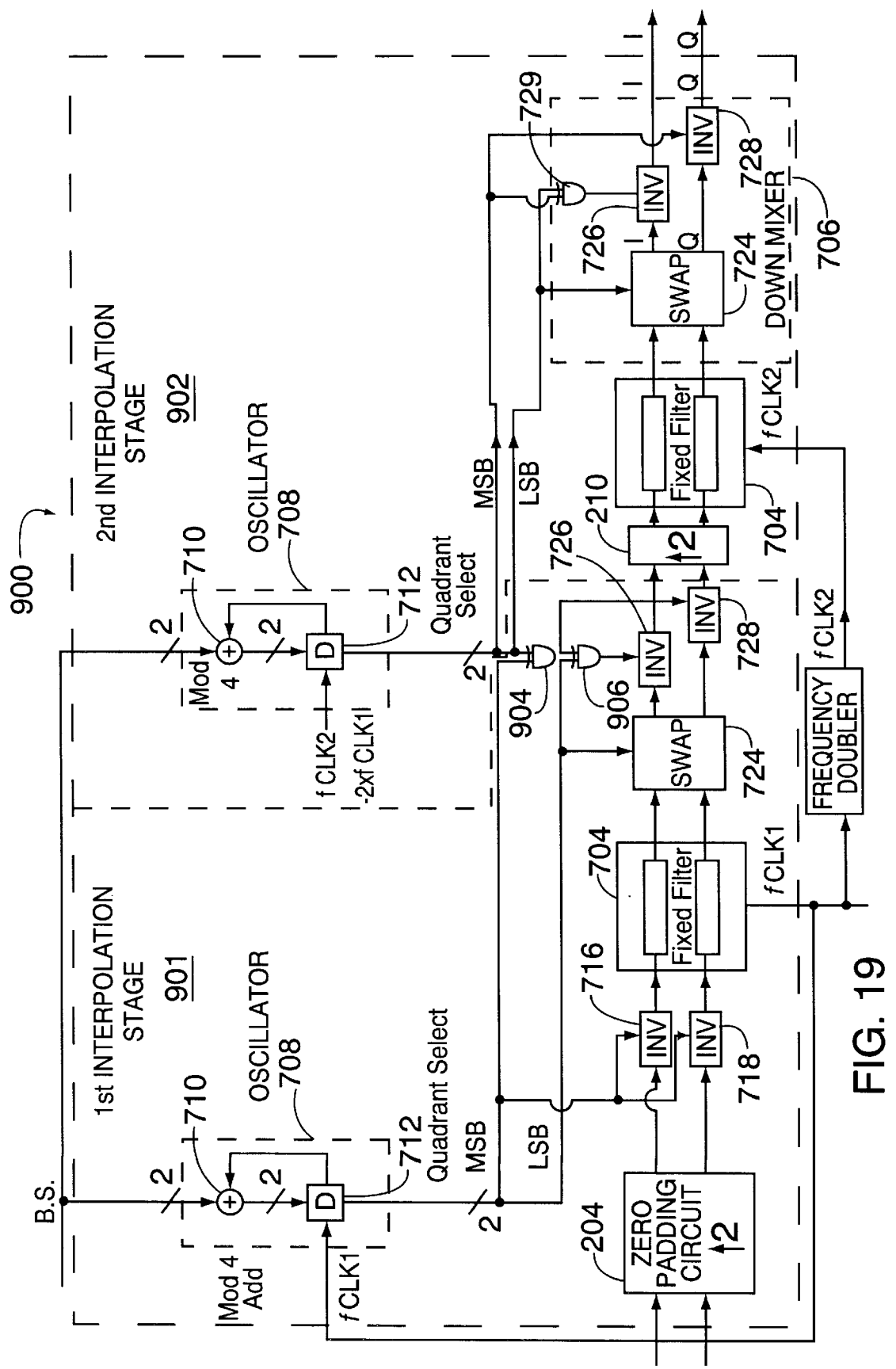
FIG. 19 illustrates an interpolator circuit implemented in accordance with the present invention.

In an interpolator circuit of the type illustrated in FIG. 19, where the output of one interpolation stage serves as the input to a subsequent stage, it is possible to make yet further simplifications to the configurable filter circuit of the present invention if upsampling by a factor of 2 is used and zero padding circuits 204, 210 are employed. In such a case, since the output of one interpolation stage, e.g., 901 of the FIG. 19 embodiment feeds the input of the subsequent stage 902, the function of inversion or non-inversion of both the I and Q signals as part of the input to a subsequent stage can be performed by the inverters 726, 728 already incorporated into the previous stage, e.g., the first stage 901 of the interpolator 900.

As will be noted from a review of FIG. 19, the control logic used to control the inverters 726, 728 comprises a pair of exclusive or gates 904, 906 as opposed to a single exclusive OR gate 729 as in the FIG. 18 embodiment. The first exclusive OR gate 904 receives at its first and second inputs the MSB of the quadrant select signal output by the oscillators 708 of the first and second interpolation stages 901, 902. The output of the first exclusive OR gate 904 is coupled to the control input of the second inverter circuit 728 and to a second input of the second exclusive OR gate 906. The first input of the exclusive OR gate 906 receives the LSB of the quadrant select signal output by the oscillator 708 of the first interpolation stage 901. The output of the second exclusive OR gate serves as the input to the first inverter 726 of the first interpolation stage 901.

In the FIG. 19 embodiment, the zero padding circuit 210 of the second interpolation stage 902 has been placed directly before the second stage's fixed filter 704. In this configuration, the functionality of the output inverters 726, 728 of the first and second stages are combined under the control of the quadrant control signals output by the oscillators 708 of both the first and second interpolation stages 901, 902.

By using upsampling by a factor of 2, and the output inverters 726, 728 of the first interpolator stage 901 in the above described manner, the need for inverters at the input to the fixed filter 704 of the second interpolation stage 902 is eliminated. Furthermore, because the frequency of the clock signal used to drive the oscillator 708 and fixed filter 704 of the second interpolation stage 902 is a multiple of the frequency of the clock signal used to drive the first interpolation stage 901, it may be derived from the first clock signal fclk1 by using, e.g., the frequency doubler 910. Alternatively, instead of using a frequency doubler as illustrated in FIG. 19, the clock signal $f_{clk1}$, may be generated, e.g., from $f_{clk2}$, using a frequency divider assuming that a clock signal having the frequency $f_{clk2}$ is available.

Figure 20:
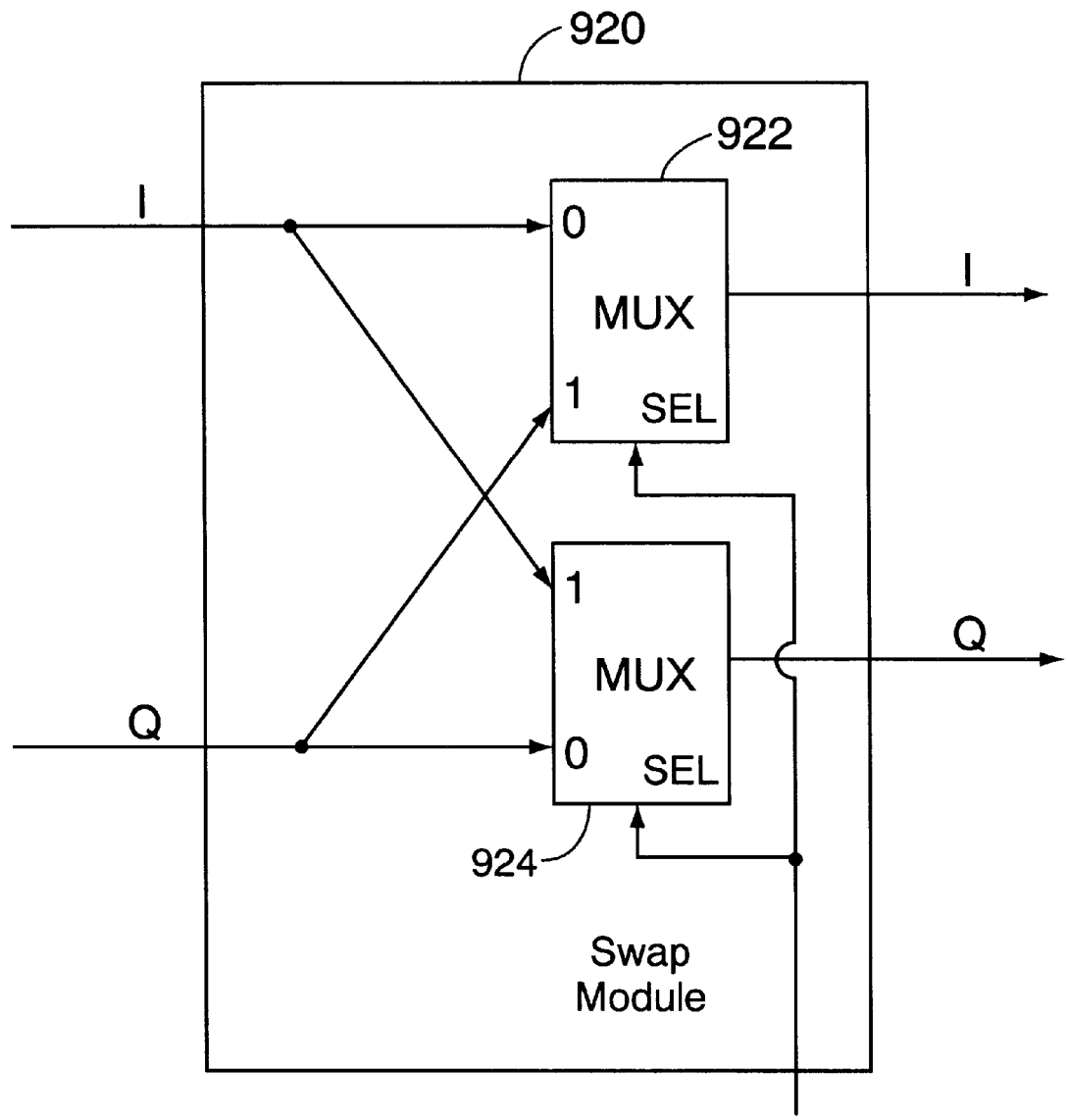
FIG. 20 illustrates a swap module suitable for use with the interpolator circuit illustrated in FIG. 19.

The controllable swap module 724, illustrated in the FIGS. 18 and 19 embodiments, takes the I and Q signals received at its inputs and either passes these signals to its corresponding I and Q outputs or interchanges them in response to the control signal supplied to the swap module 724. Referring now to FIG. 20, there is illustrated a swap module 920 suitable for use as the swap module 724 of the embodiments illustrated in FIGS. 18 and 19. The swap module 920 comprises first and second multiplexers 922, 924. The first multiplexer 922 receives the I input signal at a first input and the Q input signal at a second input. Similarly, the second multiplexer 924 receives the I input signal at a first input and a Q input signal at a second input. When the control signal supplied to the first and second multiplexers 922, 924 is asserted, the first multiplexer outputs to the I signal output of the swap circuit 920 the Q signal received at its second input and the second multiplexer 924 outputs to the Q output of the swap module the I signal received at its first input. In this manner the I and Q signals are swapped. In the event that the control signal supplied to the first and second multiplexers 922, 924 is not asserted the I and Q signals received at the inputs to the swap module are merely passed to the corresponding outputs of the swap module 920 with no swap being performed.

The controllable inverters 728 of FIGS. 18 and 19 receive a real input signal representing either an I or Q portion of the complex signal. If the control signal supplied to an inverter 728 is asserted, the controllable inverter outputs the additive inverse (negative) of the received signal. However, when the control signal supplied to a controllable inverter 728 is not asserted, the inverter 728 merely outputs the signal received at its input.

A modulator 100 including a mixer 106 operating at a low sampling rate followed by, in general, a number of upsampling interpolation stages has been described. As previously discussed, each upsampling interpolation stage can be implemented using a configurable filter to select and reject, respectively, signal and image components supplied to the configurable filter. Methods and apparatus for controlling the modulator 100 and configurable filters of a plurality of interpolation stages, e.g., stages 201, 202, 203 of the interpolation circuit 200 will now be described.

Because the mixer 106 operates at a relatively low rate compared to the ultimate output sampling rate, it need operate over only a relatively small frequency range when compared to the ultimate output sampling rate.

A method of controlling the filters 206, 212, 222 in an upsampling interpolator which performs upsampling by a factor of two and uses quadrant filters as the filters 206, 212, 222 will now be described. A two bit control signal is used to select which one of the four possible filter configurations, e.g., quadrant filters, is to be used for each interpolation stage. For exemplary purposes, the control methods and apparatus of the present invention will be described in the context of an interpolation circuit 200 having three interpolation stages 201, 202, 203 and an output sampling frequency of 100 MHz. In such a three stage embodiment, the sampling rate of the input signal to the interpolation circuit 200 is ⅛ the output sampling rate, i.e., 12.5 MHz in the case of a final stage output sampling rate of 100 MHz.

In accordance with the present invention, using the oscillator 108 and mixer 106, the carrier signal may be placed so that it will be located at a desired output frequency within the frequency range defined by the final interpolation stage's output sampling rate, e.g., in a range of 0 to 100 MHz for purposes of this example. In one embodiment an H bit frequency control word is used to specify the desired frequency of the carrier signal in the range of possible output frequencies, e.g., in the range of 0 to 100 MHz. In such an embodiment, the frequency control word is generated based on the assumption that $2^H$ values represent the entire possible final output stage frequency range, e.g., 100 MHz.

Assume, for purposes of an example, that eight bits (H=8) are used to represent the possible range of carrier signal output frequencies from 0 to 100 MHz, as determined by the output sampling rate of the third interpolation stage 203.

In such a case, 00000000 represents 0 MHz and 11111111 (255 decimal) represents 100 MHz*(255/256), i.e., 99.61 MHz. Because of the repeating nature of the spectrum of a sampled signal, 100 MHz is again represented by 00000000. In accordance with the present invention, the actual frequency represented by an H bit frequency control word is equal to the frequency range represented using the H bits divided by $2^H$. In the case of the exemplary embodiment where an output frequency range of 100 MHz and an 8 bit word representing the frequency range is used, the actual (decimal) frequency specified by an eight bit frequency control word is:

actual frequency[MHz]=frequency control word[decimal] *(100 MHz/256)

For example, in such an embodiment, the 8 bit binary frequency control word 01010101 represents the frequency (85*[100 MHz/256])=33.20 MHz. Similarly, the frequency control word 11110000 represents (240*[100 MHz/256])= 93.75 MHz.

Figure 21A:
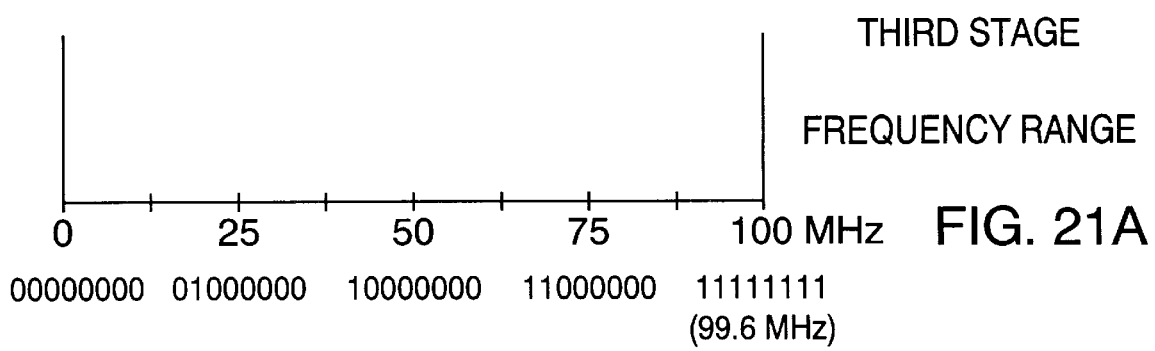
FIGS. 21A–21E, 22A–22E, 23A–23E, and 24A–24C are figures relating to the frequency range, available filter configurations, and the selection of the filter configurations, for each of the stages of a three stage interpolation circuit implemented in accordance with one exemplary embodiment of the present invention.
Figure 21B:
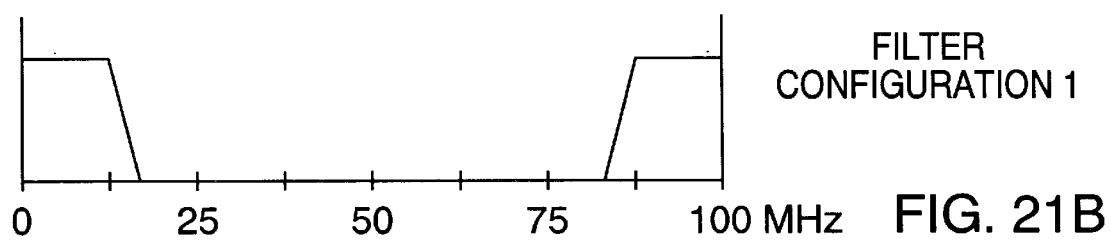
Figure 21C:
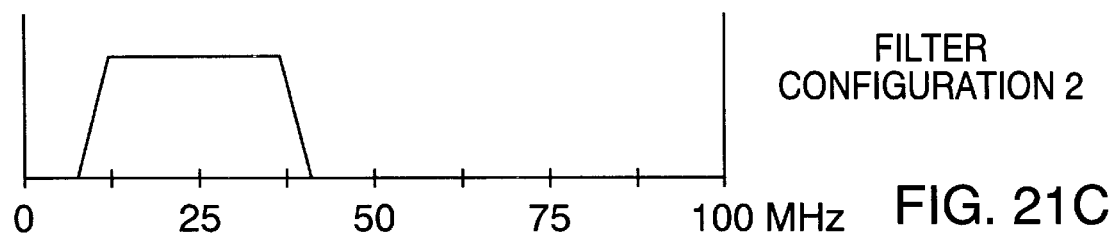
Figure 21D:
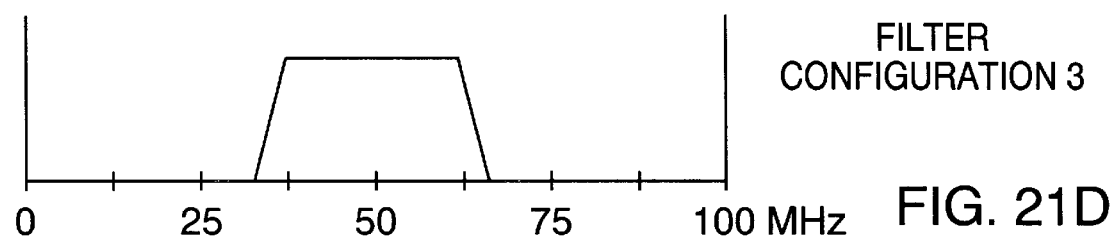
Figure 21E:
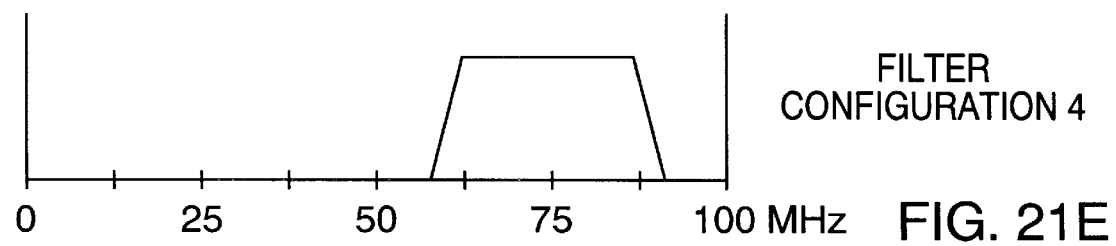

FIG. 21A illustrates the 100 MHz frequency range in which the carrier signal may be placed by the third interpolation stage ($S_2$) 203. In FIG. 21A binary frequency control words are illustrated beneath the frequency scale to illustrate the relationship between the actual (decimal) frequency and the frequency represented by an 8 bit frequency control word. FIGS. 21B through 21E each illustrate the frequency response for one of the first through fourth filter configurations which may be chosen for the third filter 222 via, e.g., the use of a two bit filter band select signal. Note that the quarter band filter illustrated in FIG. 21B is centered at 0 MHz, the quarter band filter illustrated in FIG. 21C is centered at 25 MHz, the quarter band filter illustrated in FIG. 21D is centered at 50 MHz and the quarter band filter illustrated in FIG. 21E is centered at 75 MHz. Thus, at the output stage of the interpolator circuit 200, the four selectable filter configurations are centered at 0, 25, 50, and 75 MHz corresponding to frequency control words 00000000, 01000000, 10000000, and 11000000, respectively.

Because 2× interpolation stages 201, 202, 203 are used in the exemplary embodiment, the output sampling frequency Fs of the second interpolation stage ($S_1$) 202 will be one half that of the third and final interpolation stage ($S_2$) 203. Accordingly, if the output sampling frequency of the third stage ($S_2$) is 100 MHz, the output sampling frequency of the second interpolation stage ($S_1$) 202 will be 50 MHz. In addition, at the second stage ($S_1$), the carrier signal may be located anywhere within the 50 MHz range determined by the second stage's output sampling frequency.

Figure 22A:
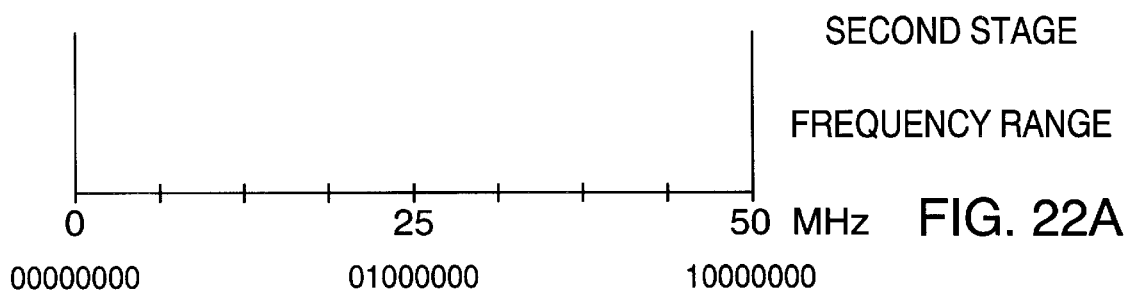
Figure 22B:
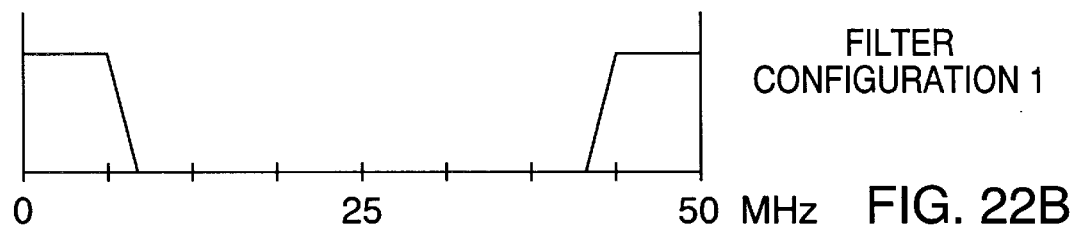
Figure 22C:
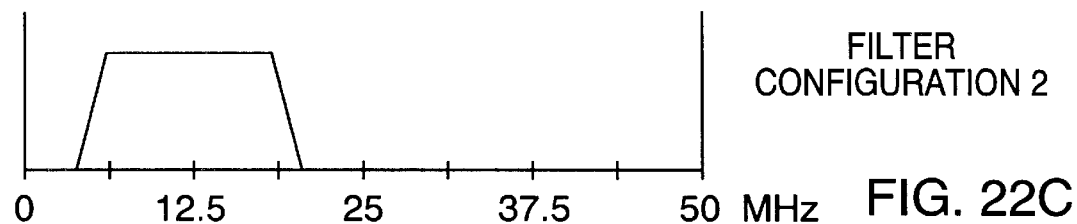
Figure 22D:
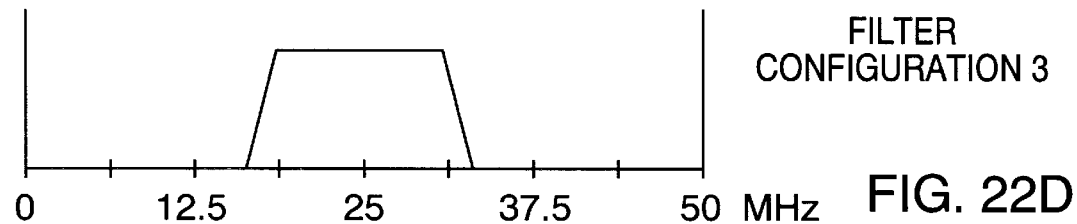
Figure 22E:
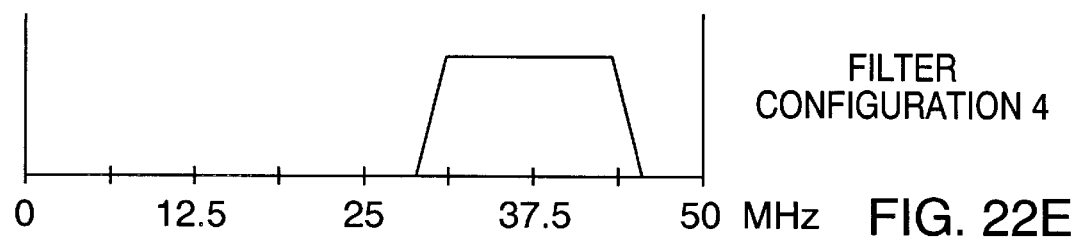

FIG. 22A illustrates the 50 MHz frequency range in which the carrier signal may be placed by the second interpolation stage ($S_1$) 203. Binary frequency control words are illustrated beneath the frequency scale in FIG. 22A to illustrate the relationship between the actual (decimal) frequency and the frequency represented by an 8 bit frequency control word. FIGS. 22B through 22E each illustrate the frequency response for one of the first through fourth selectable quarter band filter configurations which may be chosen for the first filter 212 via, e.g., the use of a two bit filter band select signal. Note that the quarter band filter illustrated in FIG. 22B is centered at 0 MHz, the quarter band filter illustrated in FIG. 22C is centered at 12.5 MHz, the quarter band filter illustrated in FIG. 22D is centered at 25 MHz and the quarter band filter illustrated in FIG. 22E is centered at 37.5 MHz. Thus, at the second stage ($S_1$) of the interpolation circuit 200, the four selectable filter configurations are centered at 0, 12.5, 25, and 37.5 MHz corresponding to frequency control words 00000000, 00100000, 01000000 and 01100000 respectively.

The output sampling frequency of the first interpolation stage ($S_0$) 201 is one half that of the second interpolation stage ($s_1$) 203, i.e., 25 MHz. In addition, at the output of the first stage ($S_0$) 201, the carrier signal may be located anywhere within the 25 MHz range determined by the first stage's output sampling frequency.

Figure 23A:
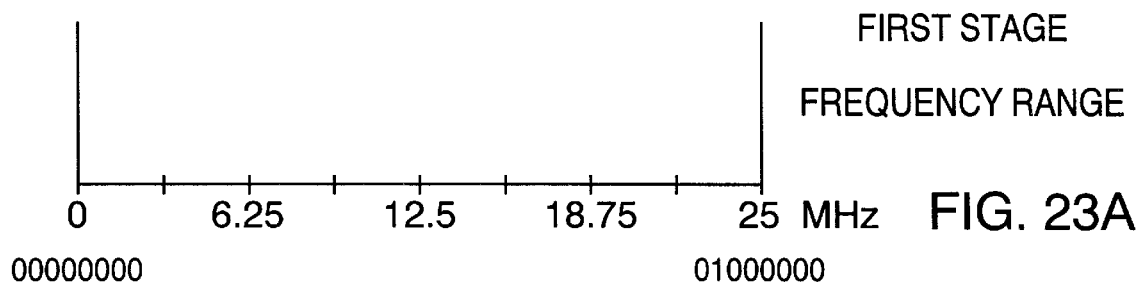
Figure 23B:
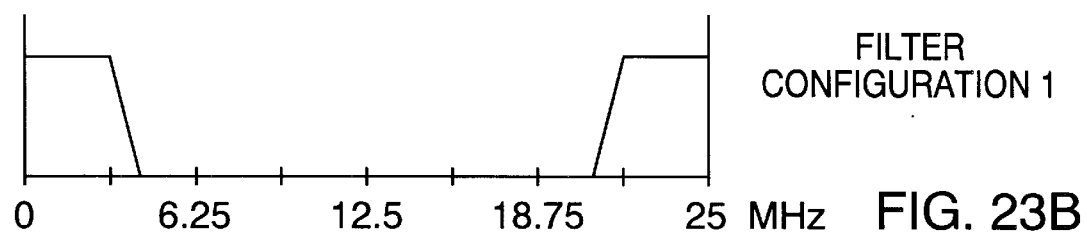
Figure 23C:
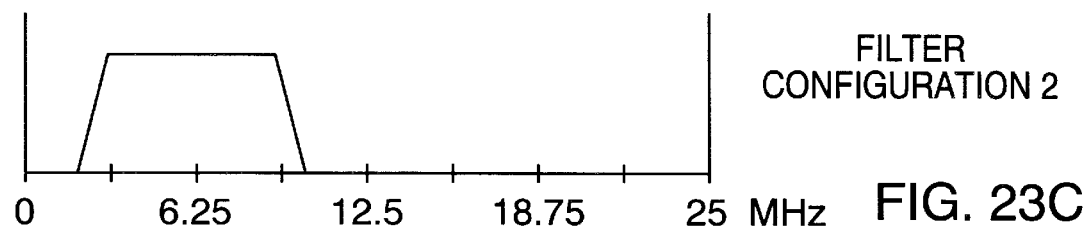
Figure 23D:
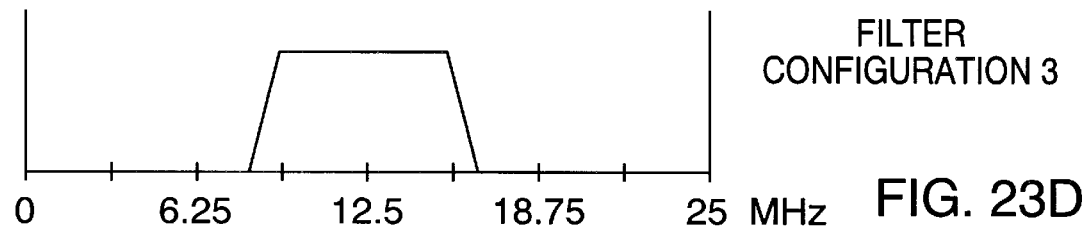
Figure 23E:
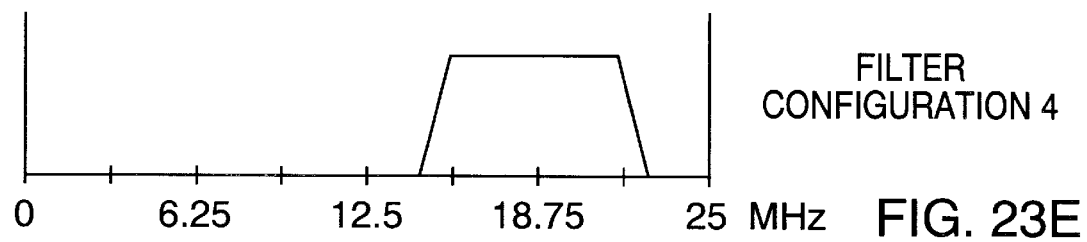

FIG. 23A illustrates the 25 MHz frequency range in which the carrier signal may be placed by the first interpolation stage ($S_0$) 201. Binary frequency control words are illustrated beneath the frequency scale in FIG. 23A to illustrate the relationship between the actual (decimal) frequency and the frequency represented by an 8 bit frequency control word. FIGS. 23B through 23E each illustrate the frequency response for one of the first through fourth selectable quarter band filter configurations which may be chosen for the first filter 206 via, e.g., the use of a two bit filter band select signal. Note that the quarter band filter illustrated in FIG. 23B is centered at 0 MHz, the quarter band filter illustrated in FIG. 23C is centered at 6.25 MHz, the quarter band filter illustrated in FIG. 23D is centered at 12.5 MHz and the quarter band filter illustrated in FIG. 23E is centered at 18.75 MHz. Thus, at the first stage ($S_0$) of the interpolation circuit 200, the four selectable filter configurations are centered at 0, 6.25, 12.5, and 18.75 MHz corresponding to frequency control words 00000000, 00010000, 00100000, and 00110000 respectively.

In accordance with one embodiment of the present invention a single H bit frequency control word is used to specify the output frequency at which an input carrier signal is to be placed. In addition, bits of the frequency control word are used to control an oscillator, e.g., the oscillator 108 to position a digital signal of interest on a carrier signal prior to the carrier signal being supplied to the input of the interpolation circuit 200. The oscillator 108 may be a numerically controlled oscillator which is controlled as a function of a numerical value generated from all or a portion of the frequency control word.

From an H bit frequency control word a two bit filter band select signal can be generated to select the appropriate one of the available quarter band filter configurations at each interpolation stage 201, 202, 203. Assume, for example, that at each of the three interpolation stages, the two bit filter band select signal 00 is used to select the filter 1 configuration, e.g., illustrated in FIGS. 21B, 22B and 23B, for the first through third interpolation stages ($S_0$) 201, ($S_1$) 202, $S_2$ (203), respectively. In such an embodiment, the two bit filter band select signal 01 is used to select the filter 2 configuration, e.g., illustrated in FIGS. 21C, 22C and 23C, for the first through third interpolation stages, respectively. In addition, the two bit filter band select signal 10 is used to select the filter 3 configuration, e.g., illustrated in FIGS. 21D, 22D and 23D, for the first through third interpolation stages, respectively. Similarly, the two bit filter band select signal 11 is used to select the filter 4 configuration, e.g., illustrated in FIGS. 21E, 22E and 23E, for the first through third interpolation stages, respectively.

Figure 24A:
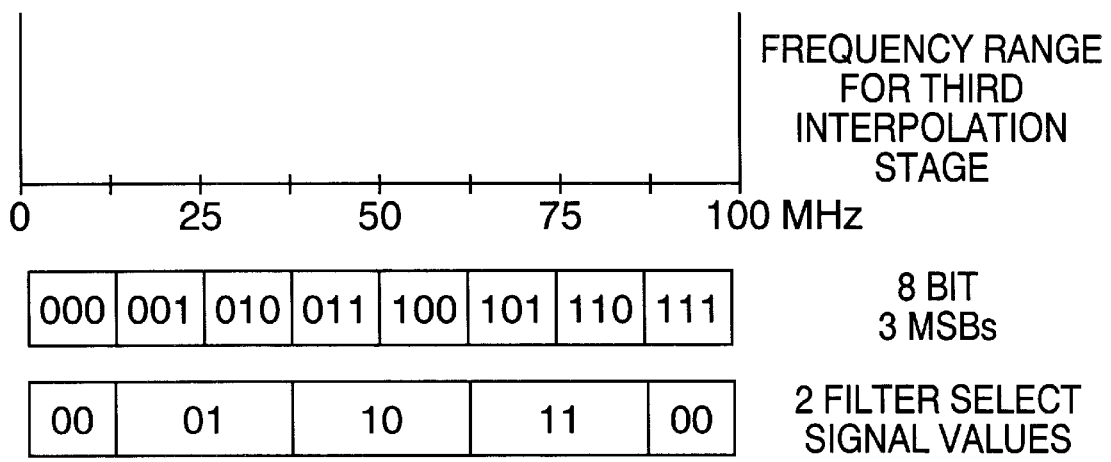
Figure 24B:
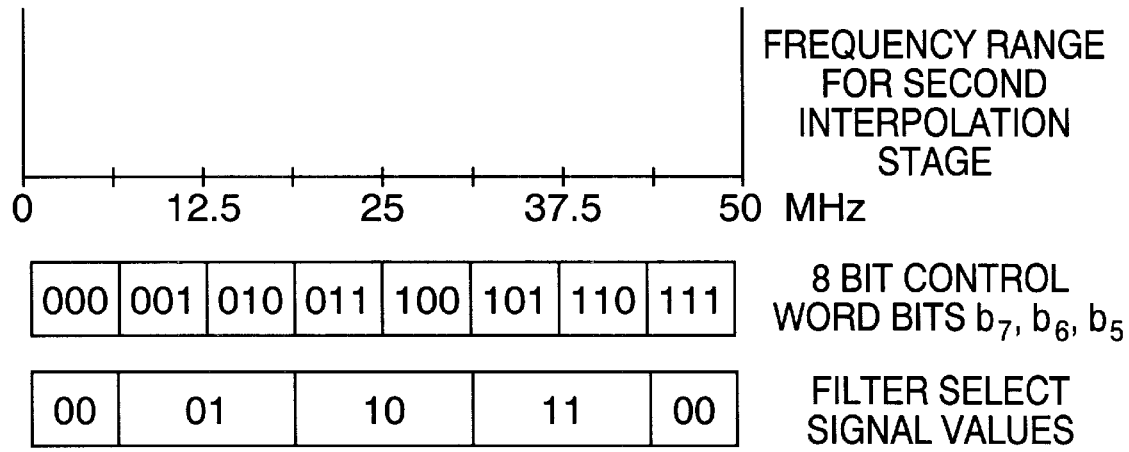
Figure 24C:
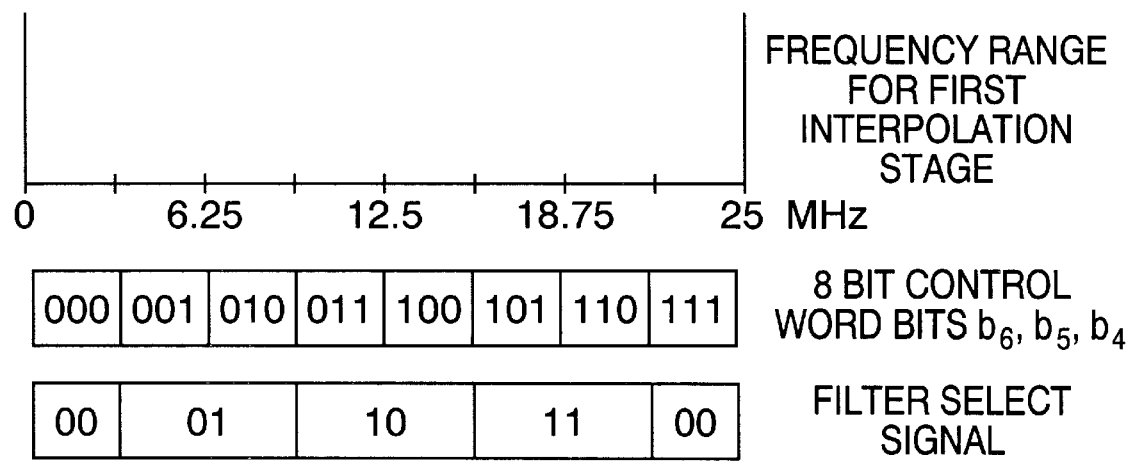

As will become apparent from a review of FIGS. 24A–24C, one can not simply use the two most significant bits from the frequency control word to select the appropriate quarter band configuration to be used at any given stage. Consider, e.g., the case of the third interpolation stage. As illustrated in FIG. 24A, in the exemplary embodiment the output frequency range of the third interpolation stage 203 is from 0 to 100 MHz, where 100 MHz is represented using a full 8 bits. In FIG. 24A, the three most significant bits (MSBs) of the eight bit frequency control word which correspond to the frequencies in the output range of 0 to 100 MHz are listed under the frequencies to which they correspond.

In accordance with the present invention, the filter configuration to be selected at each interpolation stage 201, 202, 203 is the configuration which will pass the frequency required to place the carrier signal at the ultimate desired output frequency, e.g., specified by the frequency control word. In the case of the output interpolation stage, e.g., the third stage $S_2$ 203, the filter to be selected is the filter configuration which will pass the frequency specified by the frequency control word. At the first stage from the output, in this example the second interpolation stage $S_1$, the frequency to be passed will be one half the frequency specified by the frequency control word. In addition, in this example, at the input stage, $S_0$, which is two stages from the final output, the frequency to be passed by the filter 206 will be one fourth that of the desired output frequency specified by the frequency control word.

Unfortunately, because of the locations of the passbands of the first through fourth filter configurations, e.g., the passband of the first filter configuration being centered at zero as opposed to starting at zero, it is not possible to simply select two bits, e.g., the two most significant bits ("MSBs"), of the 8 bit control word to be used as the filter configuration select signal.

Figure 25:
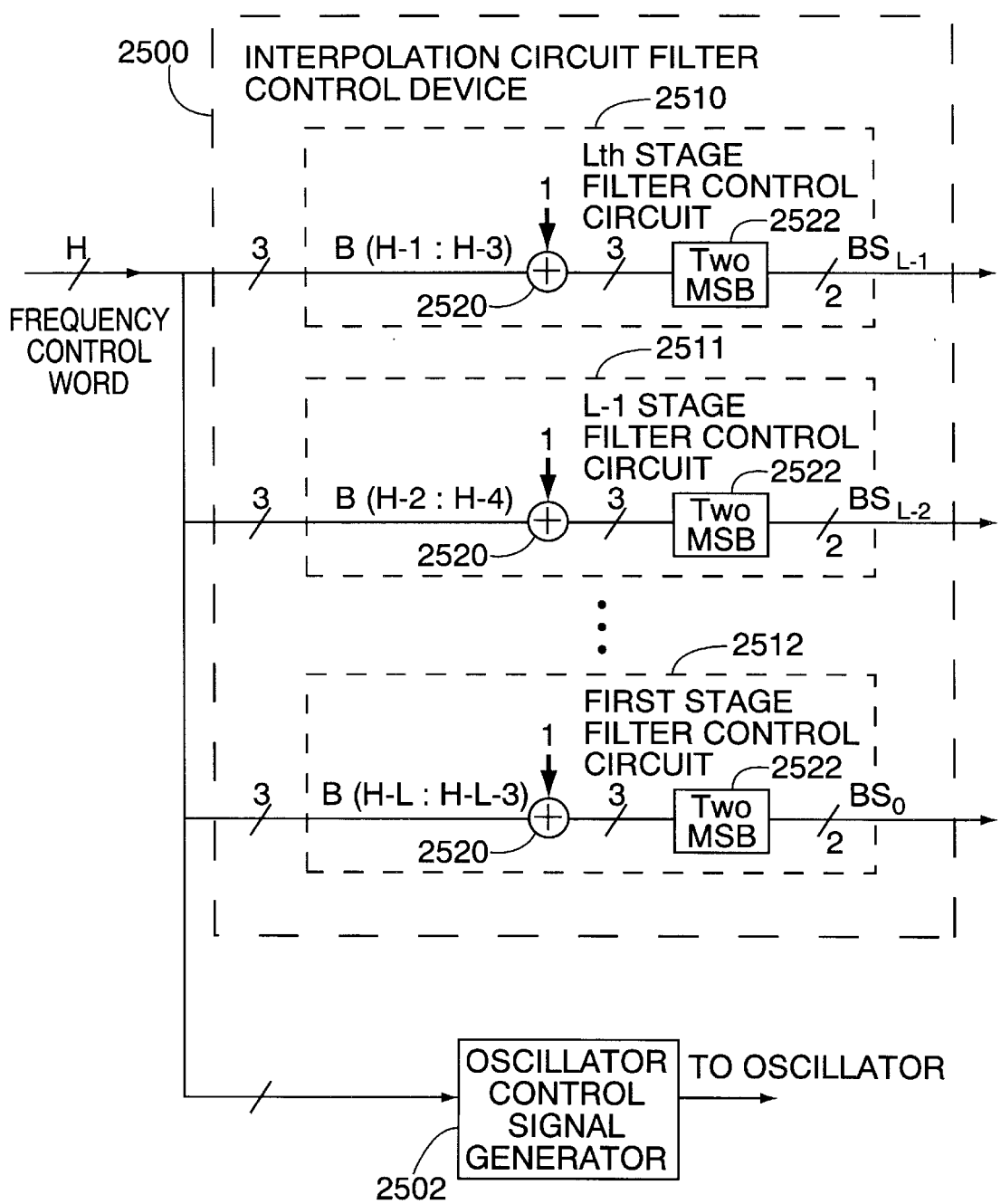
FIG. 25 illustrates an interpolation circuit filter control device and an oscillator control signal generator implemented in accordance with one embodiment of the present invention.

FIG. 25 illustrates an oscillator control signal generator 2502 and an interpolation circuit filter control device 2510.

The oscillator control signal generator 2502 is responsive to the H bit frequency control word or a portion thereof, e.g., H-L bits of the frequency control word where L represents the total number of 2× interpolations stages included in the interpolation circuit, to generate an oscillator control signal. The oscillator control signal generator 2502 translates the bits of the frequency control word into a signal which is used to control the oscillator 108, which may be, e.g., a numerically controlled oscillator.

The interpolation circuit filter control device 2500 includes a plurality of L filter control circuits 2510, 2511, 2512, with one filter control circuit being provided for each of the L interpolation stages 201, 202, 203 of the interpolation circuit 200 of the present invention. In accordance with the illustrated exemplary embodiment of the present invention, the L filter control circuits are implemented using the same or similar hardware but with different sets of bits from the H bit frequency control word as their inputs.

Each of the L filter control circuits 2510, 2511, 2512 comprises a summer 2520 and a bit selection circuit 2522 for selecting the two most significant bits output by the summer 2522. The bit selection circuit 2522 may be implemented by, e.g., discarding the third bit produced by the summer 2522.

Each of the L filter circuits take three bits of the frequency control word, adds one, and then selects the two MSBs resulting from the addition operation as the filter control signal. Assuming that the correct three bits of the frequency control word are selected as the starting point, the method performed by the filter control circuits 2510, 2511, 2512 will produce filter control signals which result in the selection of the correct quarter band filter for the particular interpolation stage 201, 202, 203 being controlled.

The filter control signal generation method of the present invention for stage 1 of an interpolation circuit 200 including L 2× interpolation stages, where l is an integer value from 0 to L−1, can be expressed as follows:

filter band select signal for stage $1 = b_{r2}b_{r1}$ where:

$b_{r2}b_{r1}$=two MSBs of $[b_{(H-1)-k}b_{(H-2)-k}b_{(H-3)-k}+1]$;

k=L−1;

H=the number values used to represent the output frequency range which is possible; and the letter b is used to represent a bit.

For example, consider an embodiment which uses an 8 bit frequency control word including bits ($b_7b_6b_5b_4b_3b_2b_1b_0$) and a circuit 100 which includes a three stage interpolation circuit 200 as the interpolation circuit 110. In addition, assume for purposes of this example that each stage of the interpolation circuit 200 performs a 2× interpolation operation, the output sampling rate of the third 2× interpolation stage is 100 MHz, and that the filter band select signals illustrated in FIGS. 24A–C are used to select one of the four possible illustrated filter configurations for each of the three stages 201, 202, 203.

In such an embodiment, if the desired output frequency of the carrier signal is 33.20 MHz, as specified by the 8 bit frequency word 01010101, the filter control signal $BSs_2$ for the third, e.g., output, interpolation stage ($s_2$) 203 would be generated by the $L^{th}$ stage filter control circuit 2510 by performing the following operation:

$$BS_{s2} = \text{two } MSBs \text{ of } [(b_7b_6b_5) + 1]$$
$$= \text{two } MSBs \text{ of } [(010) + 1]$$
$$= \text{two } MSBs \text{ of } [011]$$

$$BS_{s2} = 01$$

Referring now to FIG. 24A it is apparent that the 01 filter band select signal will control the filter 222 of the third interpolation stage 203 to select the quarter band filter centered at 25 MHz. This filter will pass the 33.20 MHz information output signal. See, e.g., the first graph illustrated in FIG. 26.

Similarly, the band select signal for the second interpolation stage ($BS_{s1}$) 202 would be generated by the L−1 stage filter control circuit 2512 by performing the following operation:

$$BS_{s1} = \text{two } MSBs \text{ of } [(b_6b_5b_4) + 1]$$
$$= \text{two } MSBs \text{ of } [(101) + 1]$$
$$= \text{two } MSBs \text{ of } [110]$$

$$BS_{s1} = 11$$

Referring now to FIG. 24B, it is apparent that the 11 filter band select signal will control the filter 212 of the second interpolation stage 202 to select the quarter band filter centered at 37.5 MHz. This filter will pass the 33.2 MHz final stage carrier output signal at the second stage. See, e.g., the second graph illustrated in FIG. 26.

In addition, the filter band select signal for the first interpolation stage ($S_0$) 201 would be generated by the $1^{st}$ stage filter control circuit 2512 by performing the following operation:

$$BS_{s0} = \text{two } MSBs \text{ of } [(b_5b_4b_3) + 1]$$
$$= \text{two } MSBs \text{ of } [(010) + 1]$$
$$= \text{two } MSBs \text{ of } [011]$$

$$BS_{s0} = 01$$

Referring now to FIG. 24C it is apparent that the 01 filter control signal will control the filter 206 of the second interpolation stage 202 to select the quarter band filter centered at 6.25 MHz. This filter will pass the 33.2 MHz final stage output signal at the first stage. That is, because of the repeating nature of a digitally sampled input signal the 33.2 MHz final stage output signal is equivalent to an 8.2 MHz signal at the output of the first interpolation stage (33.2 MHz−the 25 MHz sampling frequency of the first stage=8.2 MHz).

As discussed above, all or a portion of the frequency control word may be used to control the oscillator 108. Assuming a baseband input signal to the mixer 106, the oscillator 108 should be able to place it anywhere in the spectrum of the interpolation circuit input stage so that the carrier frequency can be placed at any desired frequency in the interpolation circuit output stage. In other words, the oscillator should be able to cover a number of distinct frequency levels equal to: (interpolation circuit input sampling frequency/output sampling frequency)*($2^H$). In the case of an interpolation circuit 200 having a total of L 2× interpolation stages, H-L bits are needed to control the oscillator to cover the desired range of distinct frequency levels.

In the exemplary embodiment, since the input stage is operating at 12.5 MHz, the oscillator 108 should be able to cover (12.5/100)*256 levels relative to the 8 bit frequency word. That is, it should cover 32 binary levels which is ⅛ the number of levels supported at the output of the 3 stage interpolation circuit 200 which achieves 8× interpolation. Because of the repeating nature of the spectrum of a sampled signal the output signal frequency of the oscillator will be replicated for a total of eight signal components within the range of 0 to 100 MHz. In such an embodiment, the five least significant bits of a frequency control word are used to control the oscillator 108. For example, if the frequency control word 01010101 was used to specify a final stage output frequency of 32.2 MHz, bits $B_4,b_3,b_2,b_1,b_0$ 10101 would be used to set the oscillator 108 to a frequency of 8.2 MHz.

Figure 26:
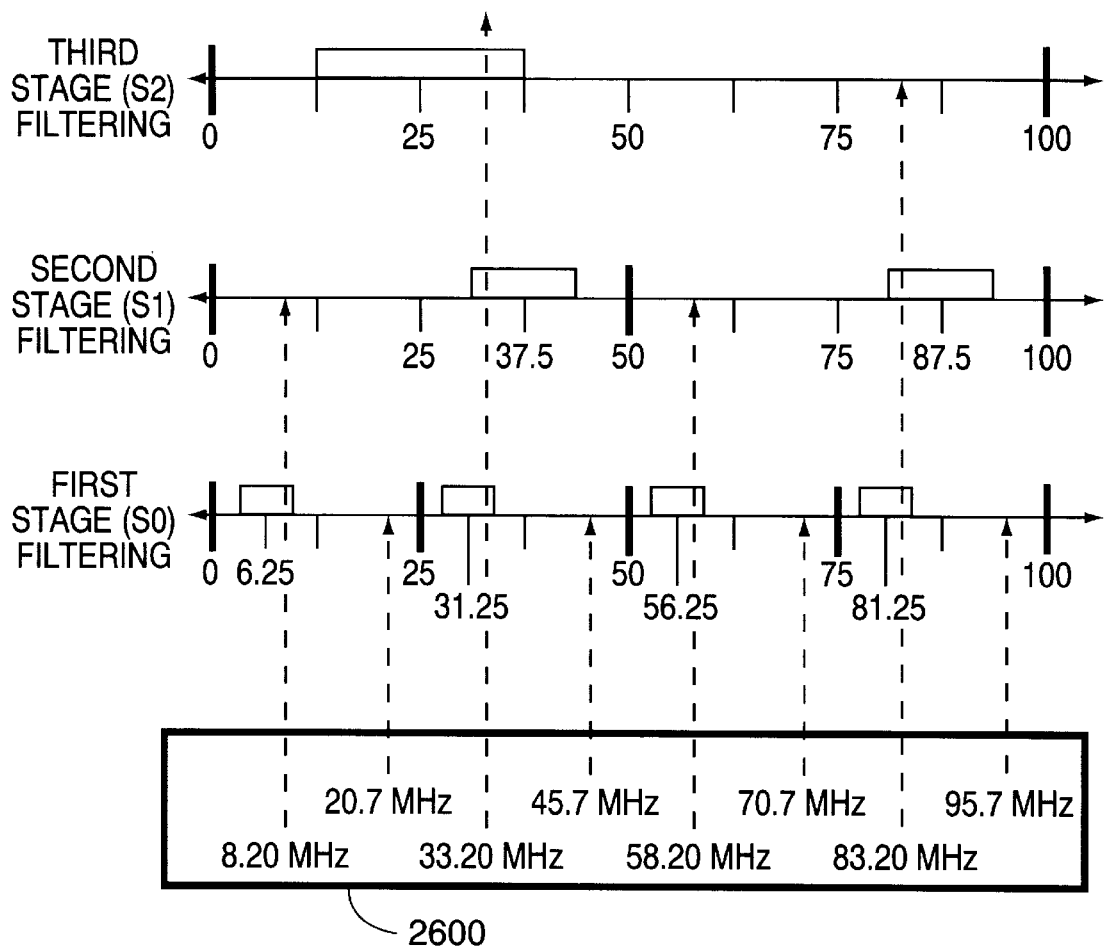
FIG. 26 illustrates the frequency response of the filter configurations selected in a three stage interpolation circuit to place a carrier signal at 33.30 MHz in accordance with one embodiment of the present invention.

FIG. 26 illustrates the action of the three stage interpolation circuit 200 when three 2× interpolation stages 201, 202, 203 are used, a signal having an input sampling rate of 12.5 MHz is supplied to the input of the interpolation circuit 200, and the filters 206, 212, 222 are controlled to place the output carrier frequency at 33.2 MHz. Note that the use of the three 2× interpolation states 201, 202, 203 will result in an output sampling rate of 100 MHz. Because, in accordance with the present invention, the input carrier frequency is controlled to be the desired output carrier frequency, e.g., 33.2 modulo the sampling rate of the input signal, 12.5 MHz, the input carrier frequency will be 8.2 MHz (33.2 MHz=8.2 MHz+(2*12.5 MHz)).

Looking at the full 100 MHz frequency spectrum, which corresponds to the final output sampling rate of 100 MHz, we can see in block 2600 that the input signal to the interpolation circuit 200 includes input signal components spaced apart by the input sampling rate, i.e., there are components at 8.2 MHz+N*12.5 MHz. As illustrated, these components fall at 8.2, 20.7, 33.2, 45.7, 58.2, 70.7, 83.2 and 95.7 MHz.

In the first interpolation stage S0 201, after upsampling by a factor of two is performed by the zero padding circuit 204, the frequency content of the input signal is not changed by the upsampling operation, however the sampling rate is increased to 25 MHz for the first interpolation stage S0. In stage S0, the filter 206 is controlled to remove components at 20.7, 45.7, 70.7 and 95.7 MHz and to pass components at 8.2, 33.2 58.2 and 83.2 MHz as illustrated in FIG. 26.

In the second interpolation stage S1 201, after upsampling by a factor of two is performed by the zero padding circuit 210, the frequency content of the signal is not changed as a result of the upsampling operation, however the sampling rate is increased to 50 MHz. In stage S1, the filter 212 is controlled to remove components at 8.2 and 58.2 MHz and to pass components at 33.2 and 83.2 MHz.

In the third and final interpolation stage S2 202, after upsampling by a factor of two is performed by the zero padding circuit 220, the frequency content of the signal is not changed as a result of the upsampling operation, however the sampling rate is increased to 100 MHz. In stage S2, the filter 222 is controlled to remove components at 83.2 MHz, and to pass the desired output component at 33.2 MHz representing the output carrier signal.

Thus, as illustrated in FIG. 26, the interpolation circuit 200 can be used to generate an output signal with a 100 MHz sampling rate and a carrier signal located at 33.2 MHz from a relatively low frequency input signal having a low 12.5 MHz sampling rate and a carrier signal located at 8.2 MHz.

While the padding and filter operations performed at each stage of the interpolation process are illustrated in this application as being implemented using separate padding and filtering circuits it is to be understood that these operations may be performed by a single device capable of achieving the padding operation as part of the filtering process.

What is claimed is:

1. A device, including:

an adjustable oscillator;

a digital mixer coupled to the oscillator;

an interpolation circuit coupled to the digital mixer, the interpolation circuit including a plurality of first through $L^{th}$ interpolation stages, each of the L stages including an adjustable filter circuit;

an interpolation circuit control device coupled to the interpolation circuit for controlling at least one of the adjustable filter circuits in response to an H bit word representing a desired interpolation circuit carrier signal output frequency.

2. The device of claim 1, further comprising:

an oscillator control device for generating an oscillator frequency control signal in response to at least a portion of the bits comprising the H bit word.

3. The device of claim 2, wherein interpolation circuit control device includes:
a plurality of L filter control circuits, each one of the L filter control circuits generating a filter control signal for controlling one of the L adjustable filter circuits.

4. The device of claim 3, wherein each one of the L filter control circuits includes:

a summer for receiving a set of three bits of the H bit word and adding one thereto to generate a three bit result; and means for selecting the two most significant bits of the three bit result as a filter control signal.

5. The device of claim 1, wherein the interpolation circuit control device includes:
a filter control circuit for generating a filter control signal for controlling one of the L adjustable filter circuits.

6. The device of claim 5, wherein the filter control circuit includes:

a summer for receiving a set of three bits of the H bit word and adding one thereto to generate a three bit result; and means for selecting the two most significant bits of the three bit result as a filter control signal.

* * * * *